Figure 1:
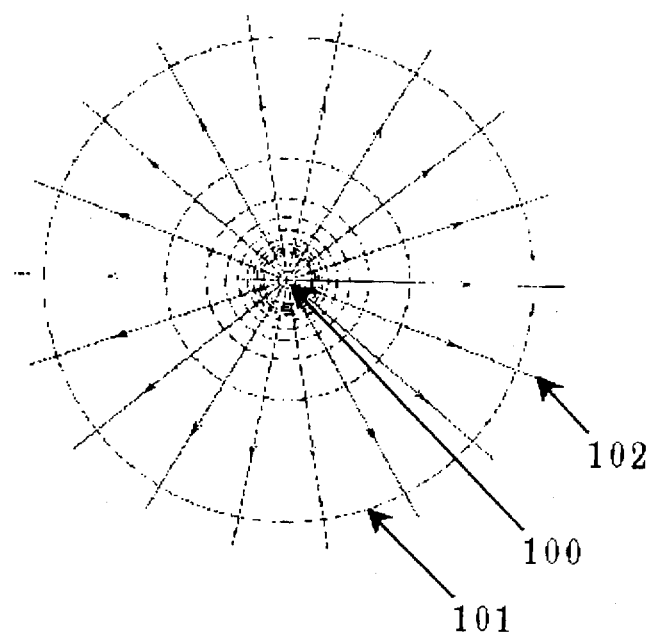

United States Patent [19]
Morton

[11] Patent Number: 5,724,336
[45] Date of Patent: Mar. 3, 1998

[54] TERA-BYTE DISK DRIVE

[76] Inventor: Steven G. Morton, 9 Old Good Hill Rd., Oxford, Conn. 06478

[21] Appl. No.: 427,456

[22] Filed: Apr. 25, 1995

[51] Int. Cl.$^6$ .................................................. G11B 9/00
[52] U.S. Cl. ................................. 369/126; 369/276
[58] Field of Search ............................. 369/126, 125, 369/120, 122, 14, 276; 365/112, 110, 109, 174

[56] References Cited

U.S. PATENT DOCUMENTS

| | | | |
|---|---|---|---|
| 4,340,953 | 7/1982 | Iwamura et al. | 369/126 |
| 5,063,538 | 11/1991 | Kuehnle | 365/106 |
| 5,327,373 | 7/1994 | Liu et al. | 365/112 |
| 5,439,768 | 8/1995 | Matsuo et al. | 430/56 |
| 5,488,601 | 1/1996 | Sakano et al. | 369/120 |

*Primary Examiner*—Tan Dinh
*Attorney, Agent, or Firm*—Harry F. Smith

[57] ABSTRACT

A new form of rotating media disk drive is described. Data storage densities of many gigabits per square inch can be obtained at low cost. Data is stored in localized regions of electric charge that are stored within a thin dielectric layer that is coated upon both sides of an electrically conductive platter, rather than in magnetic domains that are stored in thin magnetizable films that are coated upon both sides of platters. Data is stored three-dimensionally, in electric dipoles whose axes are perpendicular to the plane of the platters, rather than in magnetic dipoles that lie along the surface of a platter. Data is read and written via ungated field emitter tips rather than with transformers and magnetically sensitive elements. The read/write head is built from the read/write head chip that contains field emitter tips and other elements. This chip is an active CMOS or other circuit whose active area is parallel to one side of a platter, rather than having a single, passive write element and a single, passive read element with external control circuits and amplifiers. The read/write head chip is formed in a silicon-on-insulator (SOI) wafer, with the tips and other microelectromechanical elements being formed in the top, silicon membrane, on isolated islands or pillars, and the supporting circuitry being formed in the base silicon wafer. Each read/write head chip is attached to the end of the arm of an actuator, in a manner similar to that used in magnetic disk drives. Individual, ungated field emitter tips are electrically isolated from one another and connected to, and intimately integrated with, analog and/or digital circuitry in the read/write head chip, rather than being electrically connected to many other tips and divorced from active circuitry in their immediate vicinity that controls them, as in flat panel displays. Multiple tips can be used to increase the data rate of the disk, and to provide spares to improve the reliability of the disk.

19 Claims, 11 Drawing Sheets

TERA-BYTE DISK DRIVE

1. FIELD OF THE INVENTION

The invention relates generally to rotating mass storage devices and methods of fabricating same. It also relates to the fabrication of monolithic, integrated circuit devices containing field emitter tips and analog and digital circuitry that is intimately connected to them.

2. BACKGROUND OF THE INVENTION

2.1 Applications of the Invention

The entire computer industry relies upon disk drives for mass storage that can be accessed quickly. Many applications require vast amounts of storage and are poorly served by the low capacity and high cost of current disk drives.

Government applications for mass data storage include:
unattended gathering of sensor data
on-line storage of intelligence data
on-line storage of population data
on-line storage of patents, trademarks and courts records
on-line storage of the books in the Library of Congress
on-line storage of FBI fingerprint and criminal records
on-line storage of weather data
on-line storage of all prior versions of documents being edited
on-line storage of data currently stored being stored on magnetic tape for economy Civilian applications for mass data storage include the on-line storage of:
digitized movies for video-on-demand
commercial data bases
digitized medical images
graphics images
computer-aided-design databases
simulation data
digitized audio data bases
multimedia data
product manufacturing data

2.2 Magnetic Disk Drives

The operation of magnetic disk drives is well known. A description of the basic principles is given in "Disk-Storage Technology" and "Magnetic disks: storage densities on the rise", *Introduction to Magnetic Recording*, Robert M. White (ed.), IEEE Press, 1985, pp. 62 to 78.

2.3 Field Emitter Tips

Field emitter tips are tiny, sharp-pointed devices. They typically have a base that is a micrometer or less in diameter, a height of a micrometer or less, and a point with a very small radius, typically 25 nm or less. They can be made with a metal gate that is roughly coplanar with their point and controls the emission of electrons from the device, for use in flat panel displays, or without a gate for use in making scanning tunneling microscopes and atomic force microscopes. They can be formed by depositing metal in a way that forms a cone with a sharp point, or from monocrystalline silicon using atomic-lattice-specific etching.

The fabrication of these tips is well known and described in many sources; a few examples are given here:

The fabrication of metallic, gated field emitter tips using the Spindt process is described in "Review: Vacuum Microelectronics—1992", H. Busta, *J. Micromech. Microeng.* 2 (1992), IOP Publishing Ltd. (UK) pp. 43 to 74.

The typical, planar configuration of field emitters and gates for use in a flat panel display is described in "Vacuum Microelectronic Devices", I. Brodie and P. Schwoebel, *Proceedings of the IEEE*, vol. 82, no. 7, July 1994, pp. 1006 to 1034.

The fabrication of emitter tips with large aspect ratios is described in "Microfabricated field-emission and field-ionization sources", C. A. Spindt, *Surface Science* 266 (1992) pp. 145 to 154, Elsevier Science Publishers.

2.4 Ultraflat Silicon Wafers

Hughes Danbury Optical Systems in Danbury, Conn. has developed a plasma assisted chemically etched (PACE) technique for dramatically reducing the total thickness variation of semiconductor wafers. This reduction is typically used to reduce the amount of refocusing required by semiconductor photolithographic systems and enabling the fabrication of smaller feature sizes. Their standard specification for total thickness variation for silicon wafers is 300 nm (max.), with typical performance of 100 nm, a large improvement over the specification provided by wafer vendors. This relatively high specification is set by the equipment that measures the flatness of the wafer. Their specification for silicon-on-insulator wafers is far better, in the range of 10 to 50 nm, because they use their own measurement equipment that can see through the thin silicon membrane on a silicon-on-insulator wafer.

2.5 Low-profile Chip Interconnections

U.S. Pat. No. 4,622,574, "Semiconductor Chip with Recessed Bond Pads", was issued to E. Garcia and describes a technique for forming trenches along the entire length and/or width of a chip, and placing the bond pads in the bottom of the trenches. A sloping surface was fabricated between the bottom of the trenches and the top surface of the chip. Metallization was placed on the passivated sloping surface that connected a bond pad in the bottom of the trench to a bond pad on the top of the chip. Wire bonds were connected to the pads in the bottom of the trench.

Among the difficulties with this approach are the use of additional processing steps after the chip is otherwise completed to form the trench, expose the upper pads, passivate the sloping surface, and connect the upper pads to the lower pads. In addition, the metallization on the top of the chip protruded above the top surface of the chip since it passed over a passivation layer on its way to connecting to an upper bond pad, and, the trenches, which went entirely across the wafer along the saw alleys between the dice, carry away photoresist that is being applied to the wafer to complete the processing of the recessed bond pads.

2.6 Data Storage in Unpatterned, Silicon Nitride Thin Films

The electrostatic storage of data in a rotating disk covered with silicon nitride is described in "Rotating MNOS Disk Memory Device", S. Iwamura et al, *IEEE Transactions on Electron Devices*, vol. ED-28, no. 7, July 1981, pp. 854 to 960. A 3" diameter silicon wafer was coated with a thin layer (several nm thick) of silicon dioxide and then a 50 nm thick layer of silicon nitride. A tungsten carbide tip was used as the read/write mechanism. Data storage density of 6.4 giga-bits/square inch with the system operating in air was claimed using a capacitive readout mechanism. It was claimed to be capable of not only writing data but also of rewriting data upon previously written data. However, it was used to record and playback video signals, like an audio CD-ROM, not as a random-access disk drive that could support many files of varying sizes. And, unlike in a disk drive, there was no read/write head that levitated itself above the disk; instead, the tip was held in place by a microscope, and no servo mechanism that automatically positions the read/write element was described.

In the article, data was stored as charge in the silicon nitride. This charge formed a depletion layer in the silicon. Data was read back by detecting the resulting change in capacitance with the aid of a high frequency carrier signal. The critical parameters in the disk were the density of traps in the silicon nitride, for they store the electrons that represent the data, and the distance of the read/write tip from the substrate (only a few nm, a little more than the distance used by an atomic force microscope).

The storage of electrostatic charges at high density in a dielectric (a silicon nitride film) using a scanning capacitance microscope (SCaM) in the current-emission mode to place charge in the substrate is described in "Charge storage in a nitride-oxide-silicon medium by scanning capacitance microscopy", R. Barrett et al, *J. Appl. Phys.* 70 (5), 1 Sept. 1991, pp. 2725–2733. A data storage density of 27 giga-bits/square inch was reportedly obtained, and a maximum data storage density of about 640 giga-bits/square inch was forecast, giving a minimum bit size of several tens of nm square. However, the SCaM playback mechanism used, a stylus drawn over the substrate, provided a very low data rate. Furthermore, the substrate was stationary and only a tiny portion was used for the recording of data.

It was also reported in this article that chemically grown oxides stored charge for relatively short periods of time, but they could be erased easily. In contrast, very high quality, thermally grown oxides showed excellent charge retention and no charge spreading but were very difficult to erase, presumably because it is very difficult to de-trap the stored charge. In addition, it was reported that the mean spacing between nitride traps is about 5 nm.

2.7 Formation of Servo Tracks

All disk drives use servo systems to help determine where to record data on the disk, so that useful information is not overwritten on a read/write disk, and to help determine where to read back previously stored data from the disk.

The earliest multiplatter disk drives dedicated one side of one platter to servo tracks so the other platters could be dedicated to data. This design required that the positioning of all of the read/write heads be precisely known relative to one another and that distortions in the spindle, platter and actuator (which holds the heads) be minimized. Due to bending and thermal distortions, the size of these structures (several inches) severely limited densities and this approach is no longer used.

The approach used in most multiplatter disk drives is to record servo tracks in each side of each platter. The disk drive first locates a servo track on the side of interest of a platter of interest, and then adjusts the position of the read/write head relative to the servo track. Since current disk drives can only read or write at a single point, they cannot continuously monitor the servo track and read or write data. These servo tracks, which essentially give a coordinate system, are recorded during the final stage of disk drive assembly. Since they are recorded they can be destroyed if a failure of the disk occurs or if a software error is made, such as misidentifying the type of disk and recording data over the servo tracks.

Helios Corporation is a major vendor of disk servo-writing systems. These systems take control of the reading and writing process to record the servo tracks after the entire disk drive has been assembled. The position of the heads is determined using a laser interferometer with accuracy better than 1 microinch, and controlled via the voice coil actuator of the disk drive. Thus the basic electromechanical operation of the disk drive appears to be very precise when operated within a continuous feedback loop. A small, optically transparent window is often provided in each disk, drive, and a reflective surface provided on each read/write head, to aid the optical process. The normal, read/write mechanism for storing data is used to record and playback the servo tracks. Should a fault occur during the eventual use of the disk drive, it is possible to corrupt the servo tracks and make it difficult to impossible to retrieve the data stored.

The advantage of recording the servo tracks on fully assembled disk drives is that many mechanical errors in the fabrication and assembly of the disk drive do not matter. In particular, the repetitive runout of the motor, bearing, spindle and platter assembly drops out. Due to manufacturing tolerances, it is not possible to rotate the platters about their precise centers, the spindle about its precise center, the bearings about their precise centers, etc., giving total radial displacements from true center of 500 to 1,000 microinches (12.5 to 25 µm). However, these displacements are fixed at the time of assembly and are lumped into the category of repetitive (repeatable) runout.

However, this method of recording servo tracks is a serial process. Each side of each platter must have servo tracks written upon it, and the tracks are written one after another. This adds to the manufacturing cost, and many servo writing systems, which are expensive, are required to operate in parallel to achieve high production rates.

Sony has described a method for pre-embossing servo tracks in rigid plastic disks using a stamping technology similar to optical disks, developing magnetic disks with permanently embossed servo tracks. To generate signals from pre-embossed servo patterns, the magnetization direction of the elevated pattern and recessed area must be opposing. Therefore, a two-step magnetization method has been developed. ["Characterization of magnetizing process for pre-embossed servo pattern of plastic hard disks", Tanaka, Shoji et al, *IEEE Transactions on Magnetics* 30 6 pt 1 November 1994. p 4209–4211.]

This method avoids the use of a servo writer but, like a CD-ROM player, requires the servo system to continuously adjust for the likely off-center operation of the platters. For the relatively low track densities currently in use (5,000 to 10,000 tracks per inch), this adjustment can be made by adaptively learning the runout of each platter, finding a servo track to determine current position, and adjusting for the track position as the disk rotates. Since disk speeds of 4,500 to 7,200 rpm are used, equivalent to 75 to 120 Hz, the speeds are quite slow.

CD-ROM drives derive positional information from the data tracks and do not have dedicated servo tracks. They continuously adjust the position of the read head to compensate for several degrees of radial runout resulting from imperfections in the spindle bearing, non-concentricity of the data on the disk and the placement of the center hole, and imprecise placement of the disk on the spindle.

3. OBJECTS OF THE INVENTION

Objects of the invention are:

1. Store data at very high density on both sides of rapidly rotating platters.
2. Greatly reduce the cost of storing massive amounts of information.
3. Write, erase, rewrite, read and reread data.
4. Quickly read and write data.
5. Provide a parallel read/write mechanism that can read and write data more quickly than can be provided by single read or write elements.
6. Provide a method for integrating microelectromechanical elements and active circuitry in the same integrated circuit.

7. Provide platters with permanent servo tracks.

8. Provide a method for formatting platters having permanent servo tracks.

9. Provide a method for fabricating bonding pads in pockets so the bonding wires do not protrude above the top of the chip and so that the fabrication of the chip is simplified.

10. Provide a means for reducing the spacing between data tracks on a platter.

11. Provide a means for quickly and continuously detecting and correcting minute positioning errors of a read/write head relative to a platter.

12. Provide a means for placing data tracks in a platter more closely than the amount of non-repetitive runout of the spindle bearings rotating the platter.

13. Increase the reliability of disk drives.

14. Provide a method for focusing wafer exposure equipment on a wafer having severe topology.

15. Increase the vibration resistance of disk drives.

16. Provide a disk drive that can be used in a vacuum or harsh atmosphere.

4. SUMMARY OF THE INVENTION

The instant invention is a new form of rotating media disk drive. Data storage densities of many gigabits per square inch can be obtained at low cost. Data is stored in localized regions of electric charge that are stored within a thin dielectric layer that is coated upon both sides of an electrically conductive platter, rather than in magnetic domains that are stored in thin magnetizable films that are coated upon both sides of platters. Data is stored three-dimensionally, in electric dipoles whose axes are perpendicular to the plane of the platters, rather than in magnetic dipoles that lie along the surface of a platter. Data is read and written via ungated field emitter tips rather than with transformers and magnetically sensitive elements.

The read/write head is built from the read/write head chip that contains field emitter tips and other elements. This chip is an active CMOS or other circuit whose active area is parallel to one side of a platter, rather than having a single, passive write element and a single, passive read element with external control circuits and amplifiers. The read/write head chip is formed in a silicon-on-insulator (SOI) wafer, with the tips and other microelectromechanical elements being formed in the top, silicon membrane, on isolated islands or pillars, and the supporting circuitry being formed in the base silicon wafer. Each read/write head chip is attached to the end of the arm of an actuator, in a manner similar to that used in magnetic disk drives.

Individual, ungated field emitter tips are electrically isolated from one another and connected to, and intimately integrated with, analog and/or digital circuitry in the read/write head chip, rather than being electrically connected to many other tips and divorced from active circuitry in their immediate vicinity that controls them, as in flat panel displays. Multiple tips can be used to increase the data rate of the disk, and to provide spares to improve the reliability of the disk.

The points of the field emitter tips are positioned very close, typically 0.5 to 1.0 microinch (12.5 to 25 nm), from the surface of a platter. The platter is physically separate from the read/write head chip and rotating at high speed. Thus not only must the platters be extremely flat and smooth, but the wafers from which the read/write chips are built must also be very flat and smooth, so that the spacing between the tips and platter can be maintained.

The entire active surface of the read/write head chip is also placed very close to a platter. Allowing for variations in the topology of the surface of the chip, there will be at most a few micrometers of space between the chip and the platter. This is not enough space to connect lead wires to the chip since 25 or 32 μm diameter gold or aluminum wire is typically used. Even if tape automated bonding is used, the leads are typically 25 μm thick. To remove each bonding wire from the surface of the chip, an individual pocket for each bonding pad is used, rather than a recessed shelf that runs the entire length or width of a chip, to control the application of photoresist to the chip so that the pads can be formed as the initial metallization of the chip is being performed, rather than after all other processing is done.

Data is stored as a packet, or localized region, of charge within (not on the surface, where leakage is much higher) a thin layer of dielectric material such as silicon nitride that has been coated upon a conductive platter. It is not necessary to use a semiconductor wafer for a platter.

An ungated field emitter tip that is used for the writing of data is connected to a potential that causes it to emit electrons. A fixed amount of charge is emitted for each bit written. The potential is controlled to control the energy of the emitted electrons to control the depth and lateral extent that they penetrate the dielectric material.

Data is read out by inducing a current in an ungated field emitter tip used for the reading of data. The rotation of the disk at high speed induces a changing charge, and thus a current, in a field emitter tip used for reading data. The field emitter tip is connected to a fast, low noise, operational amplifier that is located in the immediate vicinity of the field emitter tip and monolithically integrated with it. This amplifier is integrated with the tip to provide very low capacitance and high speed. Run-length-limited coding of the data is typically used to make it possible to detect transitions from strings of 1's to strings of 0's, and vice-versa, using a clock recovery circuit to delineate the bits within the strings.

Data is stored at such high densities that proper operation of the disk drive requires that servo tracks be precisely formed on both sides of the platters. In the preferred embodiment, the servo tracks are permanently formed in the platters during the coating process for the platters rather than being written into the platters after the disk drive has been assembled. This avoids the formation of servo tracks with positional errors resulting from limitations of the spindle bearings that support the platters. When the disk is in operation, the servo tracks are precisely and continuously tracked by a portion of the read/write head chip, so relatively low cost, imprecise bearings can be used for the disk drive. An array of special microelectromechanical structures, servo detectors, is used to detect the servo tracks. These detectors are within the read/write head chip and are placed very close to a platter.

In the preferred embodiment of the invention, the platters, read/write head chips and actuator are operated in a high vacuum. Operation in a vacuum avoids the possibility of electric breakdown between the platter and the read/write head chip, avoids the corruption of data caused by cosmic rays, and reduces deterioration of the read/write head chip. However, operation in a vacuum also precludes the use of air bearings for levitating the read/write head, so electrostatic repulsion of the read/write head chip is used. Levitation pads in the read/write head are used in conjunction with the servo tracks to lift the read/write head a very small distance from the platter; they are placed very close to a platter. A three-compartment housing with two separate vacuum chambers is used for the disk drive and enables the use of low cost ball bearings with relatively large amounts of non-repetitive runout.

A comparison of prior art disk drive technology and the new disk drive technology described herein in given in the following table:

| Prior Art Disk Drive Technology (Circa April 1995) | Features of the New Disk Drive Technology Disclosed Herein |
|---|---|
| Data is stored magnetically | Data is stored electrostatically |
| Storage domains are horizontal | Storage domains are vertical |
| Production disk drives have storage density of 125 to 250 megabits/sq. inch | Target storage density is 8 to 64 gigabits/sq. inch |
| Price is $0.30 to $0.60/megabyte for multi-gigabyte drives | Target price of $0.005 to $0.01 per megabyte for multi-hundred-gigabyte drives |
| Capacity is up to 4 gigabytes in 3.5" drive and 9 gigabytes in 5.25" drive | Target capacity up to 1 terabyte in 3.5" drive and 2 terabytes in 5.25" drive |
| Read/write head is passive | Read/write head is an active CMOS circuit |
| Read/write head is fabricated with conventional lithography and thin-film processing | Read/write head is fabricated with microelectromechanical systems (MEMS) technology |
| Read/write head is placed on edge | Plane of read/write head is parallel with disk |
| Distance from tips of read and write elements to platter is a few microinches (25–75 nm) | Distance from points of read and write elements to platter is 0.5 to 1.0 microinches (12.5–25 nm) |
| Read/write circuitry is one-dimensional | Read/write circuitry is two-dimensional |
| Read/write head is fabricated from a normal silicon wafer | Read/write head is fabricated from an ultraflat, silicon-on-insulator (SOI) wafer |
| Active area of read/write head is small | Active area of read/write head is relatively large |
| Write element is a thin-film transformer | Each write element is an ungated field emitter tip |
| Read element is a thin-film transformer (older) or ferroresistor (newest) | Each read element is an ungated field emitter tip |
| Read/write head has a single read element and a single write element | Read/write head has multiple read/write elements for increased speed and reliability, plus erase, levitation and servo elements |
| Amplifiers and drivers are external to read/write head | Amplifiers and drivers are internal to read/write head |
| Read/write head is flown on a thin layer of air | Read/write head is levitated electrostatically |
| Distance of each read/write head from a platter is controlled passively | Distance of each read/write head from a platter is controlled actively |
| Reading and writing cannot be done simultaneously | Reading and writing can be done simultaneously, and on multiple tracks |
| Servo tracks are read occasionally | Servo tracks are read continuously |
| Servo tracks are written onto the platters at the time of final assembly of the disk drive and can be corrupted | Servo tracks are permanently fabricated onto the platters during the final manufacturing steps for the platters |
| Manufacturing tolerances in bearings, spindle and platters are alleviated by writing servo tracks on the assembled disk drives | Manufacturing tolerances are compensated by continuously tracking permanent servo tracks in the platters |
| Positioning of the read/write head is controlled by a voice coil actuator that receives occasional position-correcting commands from the radial-positioning servo system | Positioning of the read/write head is controlled by a voice coil actuator that continuously receives position-correcting information from the servo system |
| Platters are coated with thin layers of magnetic, rust-preventive and lubricating materials | Conductive platters are coated with a thin dielectric layer |
| Platters are made of glass (newest) or aluminum (older) | Platters are made of metallized glass or conductive, glassy carbon |
| Platters operate in air or gas | Platters preferably operate in a high vacuum, and alternatively in air or gas |
| Each read/write head has a few wires | Each read/write head has multiple wires |
| Bonding pads are at the opposite end of the read/write head from the read/write elements and can be wired to easily | Bonding pads are recessed from the top surface of the read/write head so that they do not protrude above the read/write elements |
| Housing is made of two compartments | Housing is made of three compartments |
| The compartment containing the platters must be purged to remove particles prior to being sealed with a gasket, and is usually open to the atmosphere though a filter that removes very fine particles | The compartments containing platters and bearings are purged to remove particles, then baked and evacuated (outgassed) to remove moisture prior to being hermetically sealed |

5. BRIEF DESCRIPTION OF THE DRAWINGS

Note: For ease of reference, all reference designations are of the form XXYY, where XX is a one- or two-digit figure number, and YY is a two-digit reference within that figure.

FIG. 1. Plan view of electric field created by isolated electric charge in free space (prior art).

Figure 2:
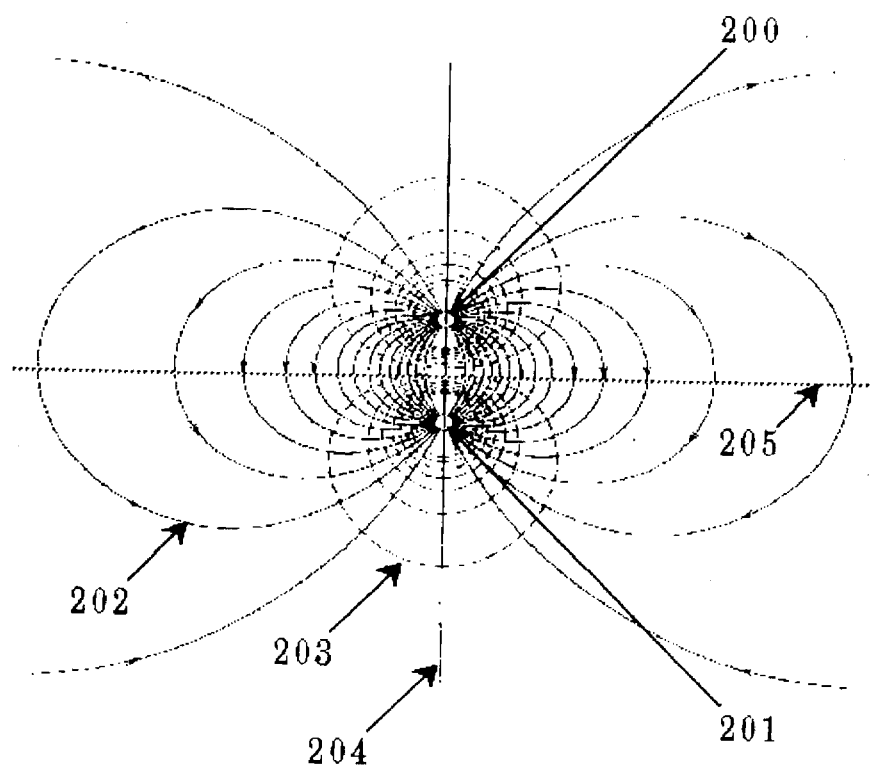

FIG. 2. Plan view of electric field created by isolated electric dipole (prior art).

Figure 3:
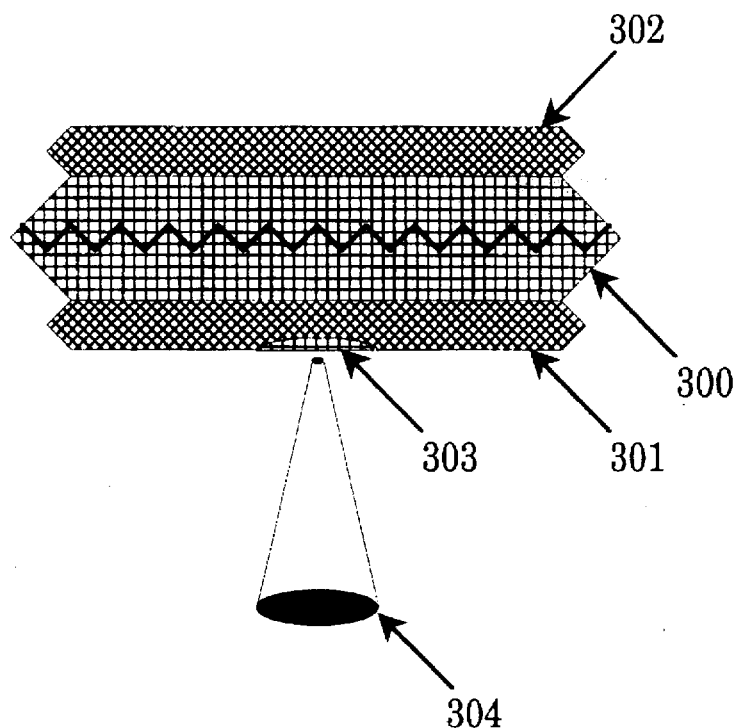

FIG. 3. Cross-sectional view of a conductive platter with data stored in it, according to this invention.

Figure 4:
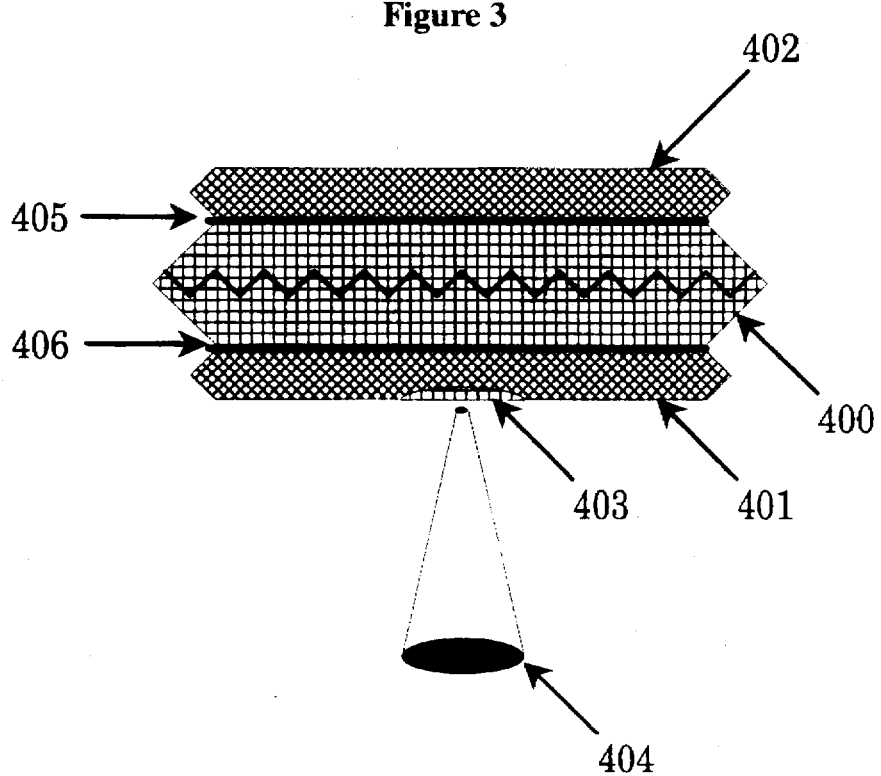

FIG. 4. Cross-sectional view of non-conductive platter with data stored in it, according to this invention.

Figure 6:
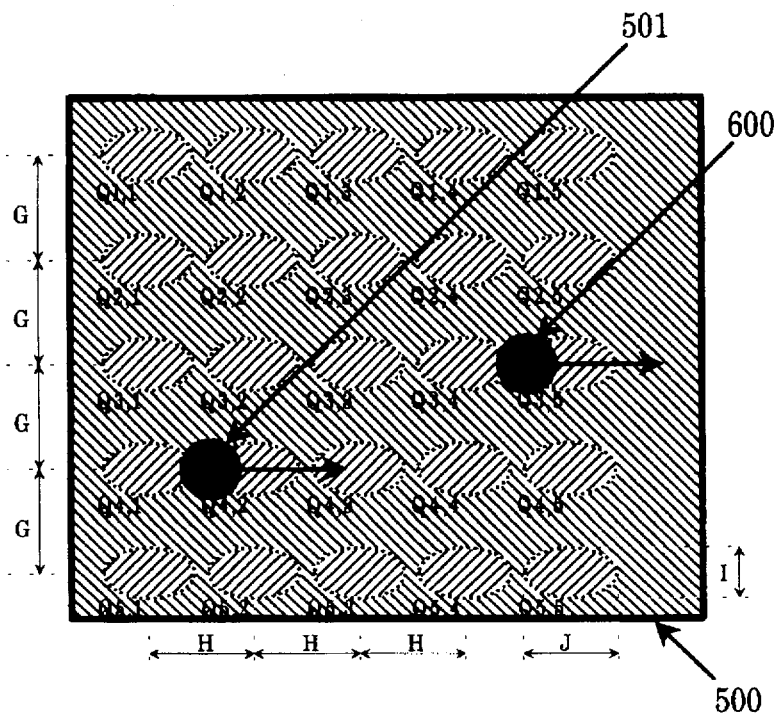

FIG. 6. Plan view of possible charge packets in the platter being accessed by two read or write elements, according to this invention.

Figure 5:
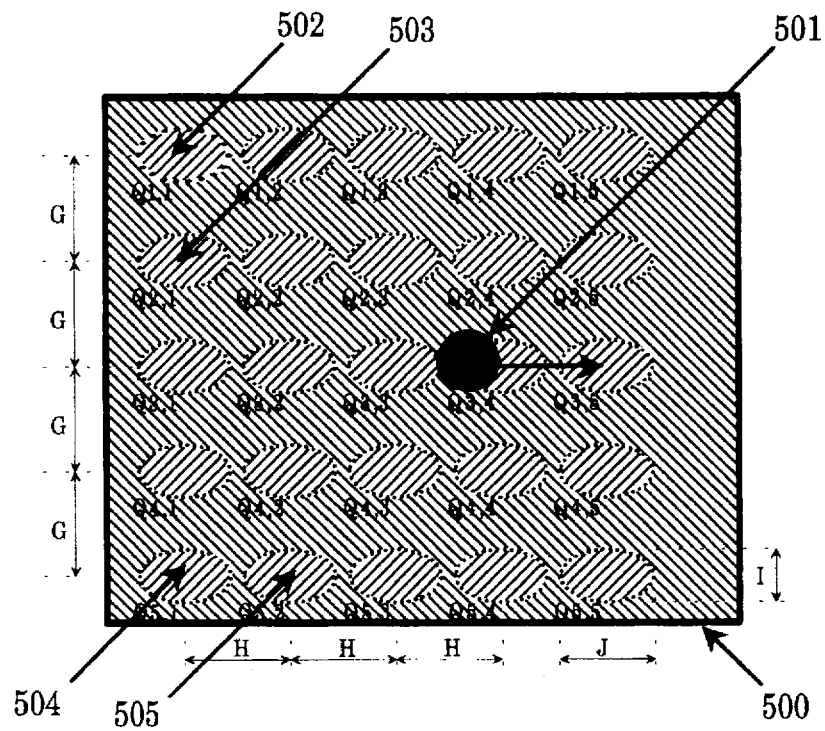

FIG. 5. Plan view of possible charge packets in the platter, according to this invention.

Figure 7:
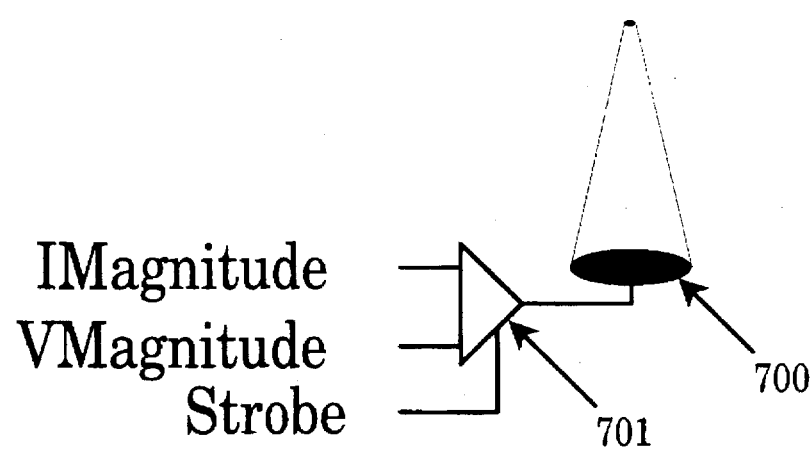

FIG. 7. Schematic of write element circuit, according to this invention.

Figure 8:
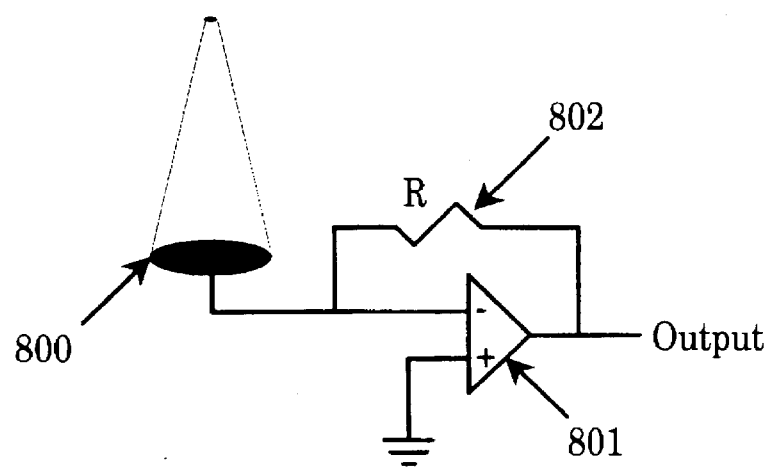

FIG. 8. Schematic of read element circuit, according to this invention.

Figure 9:
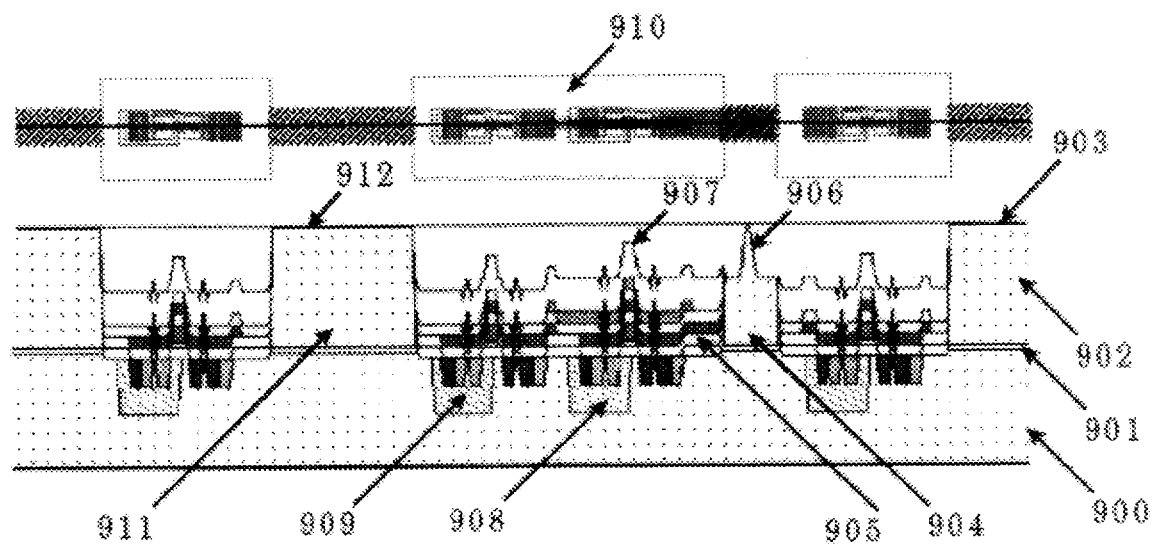

FIG. 9. Plan view and cross-sectional view of read or write tip integrated with active circuitry in read/write head chip, according to this invention.

Figure 10:
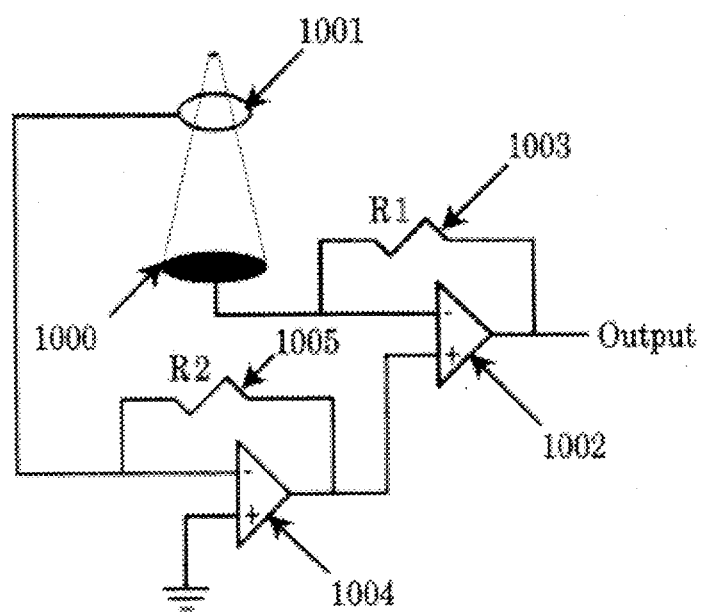

FIG. 10. Schematic of shielded read element circuit, according to this invention.

Figure 11:
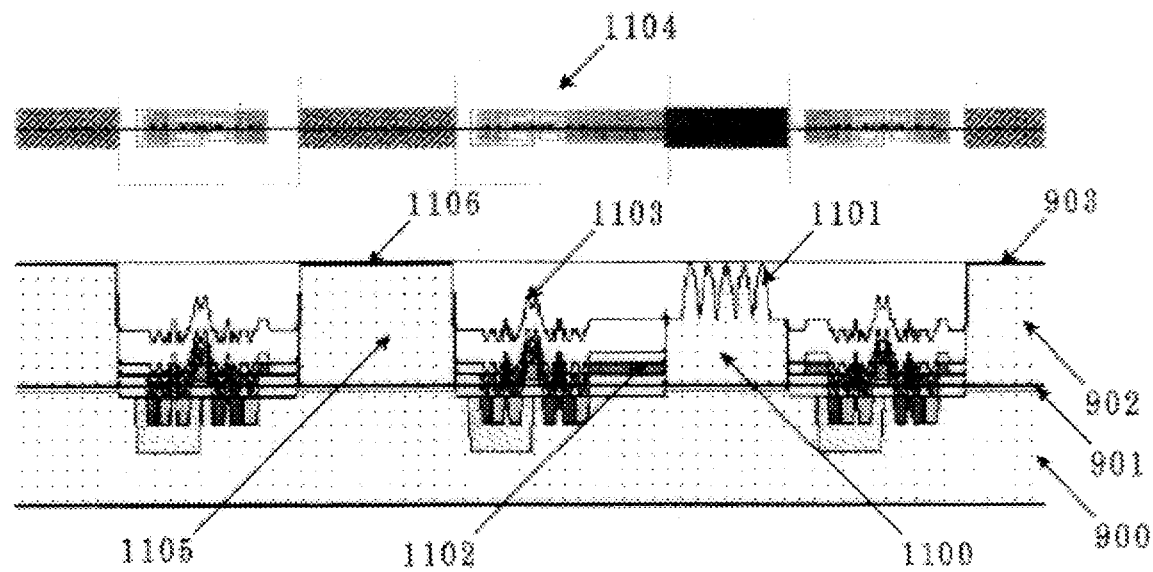

FIG. 11. Plan view and cross-sectional view of erase mechanism integrated with active circuitry in read/write head chip, according to this invention.

Figure 12:
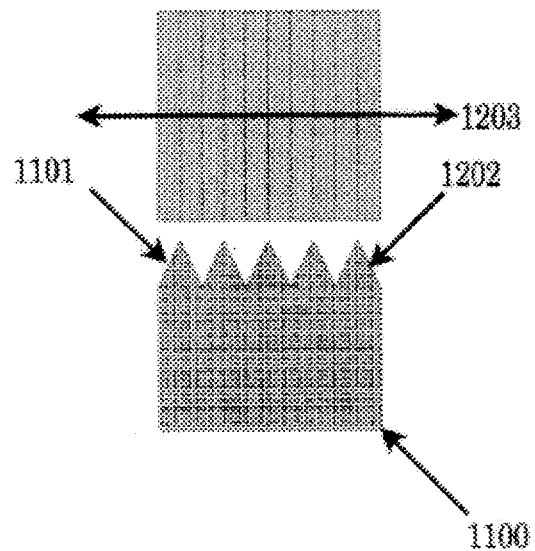

FIG. 12. Plan view and cross-sectional view of erase mechanism in read/write head chip, according to this invention.

Figure 13:
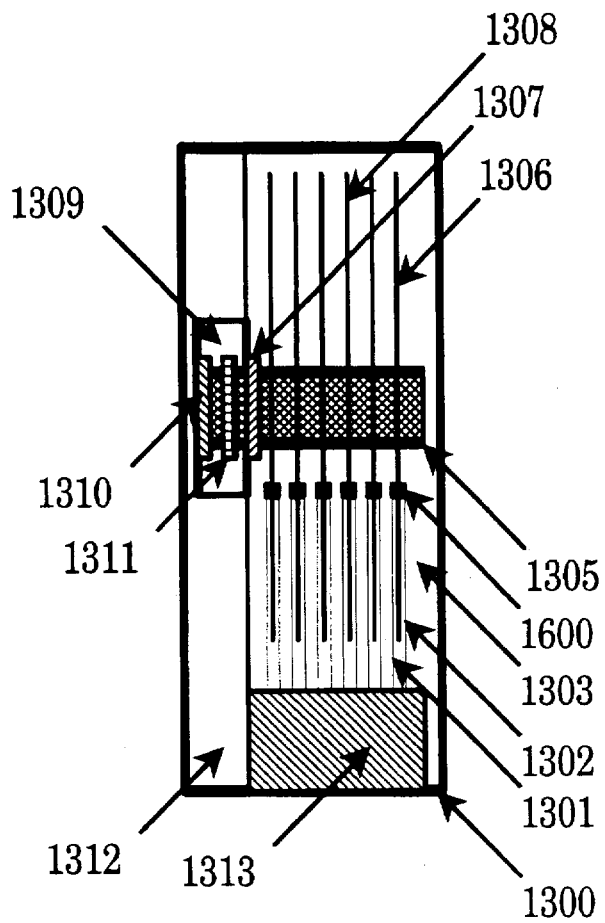

FIG. 13. Cross-sectional view of disk drive with three compartment housing, according to this invention.

Figure 14:
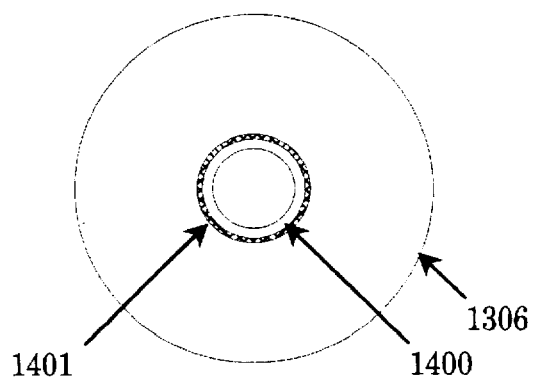

FIG. 14. Overall plan view of platter, according to this invention.

Figure 16:
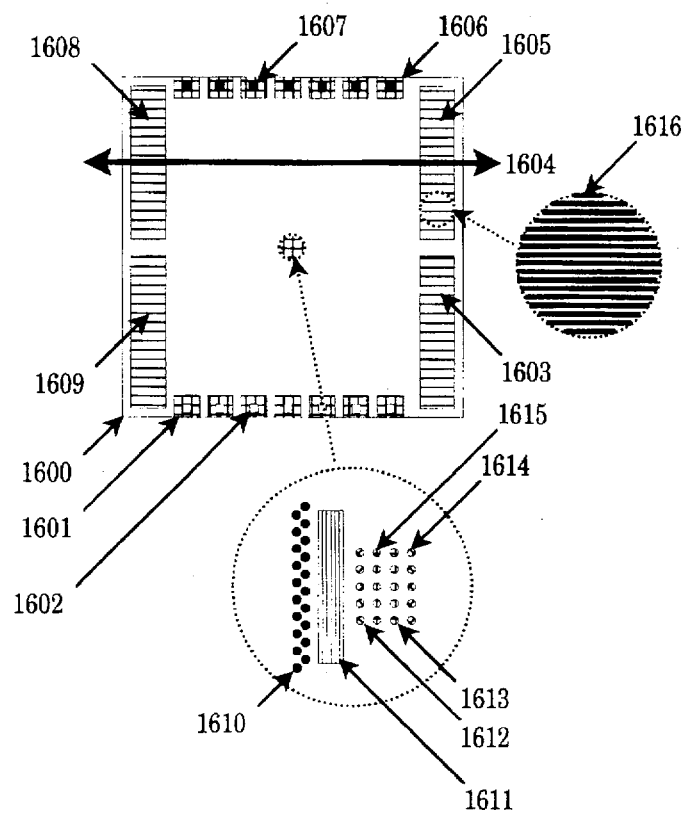

FIG. 16. Plan view of read/write head chip, according to this invention.

Figure 15:
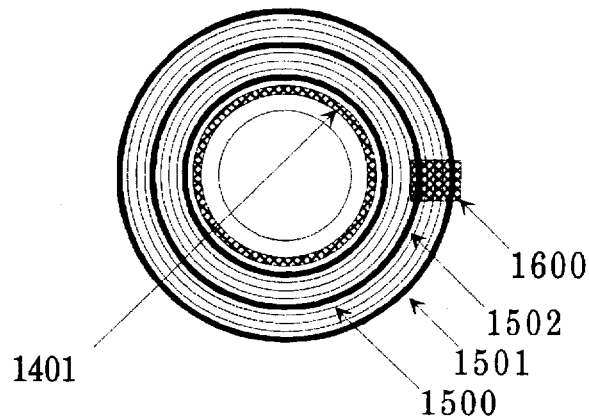

FIG. 15. Exaggerated plan view of center of platter, according to this invention.

Figure 17:
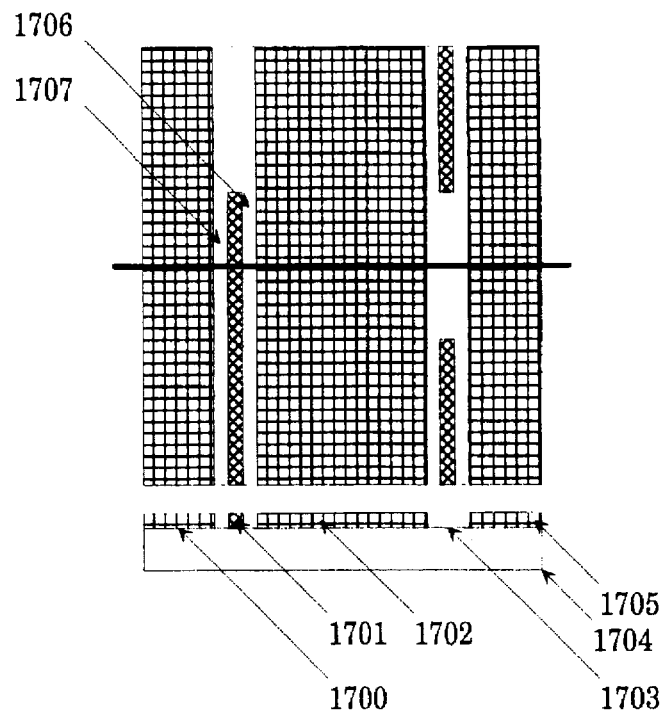

FIG. 17. Magnified plan view and cross-sectional view of platter and servo tracks, according to this invention.

Figure 18:
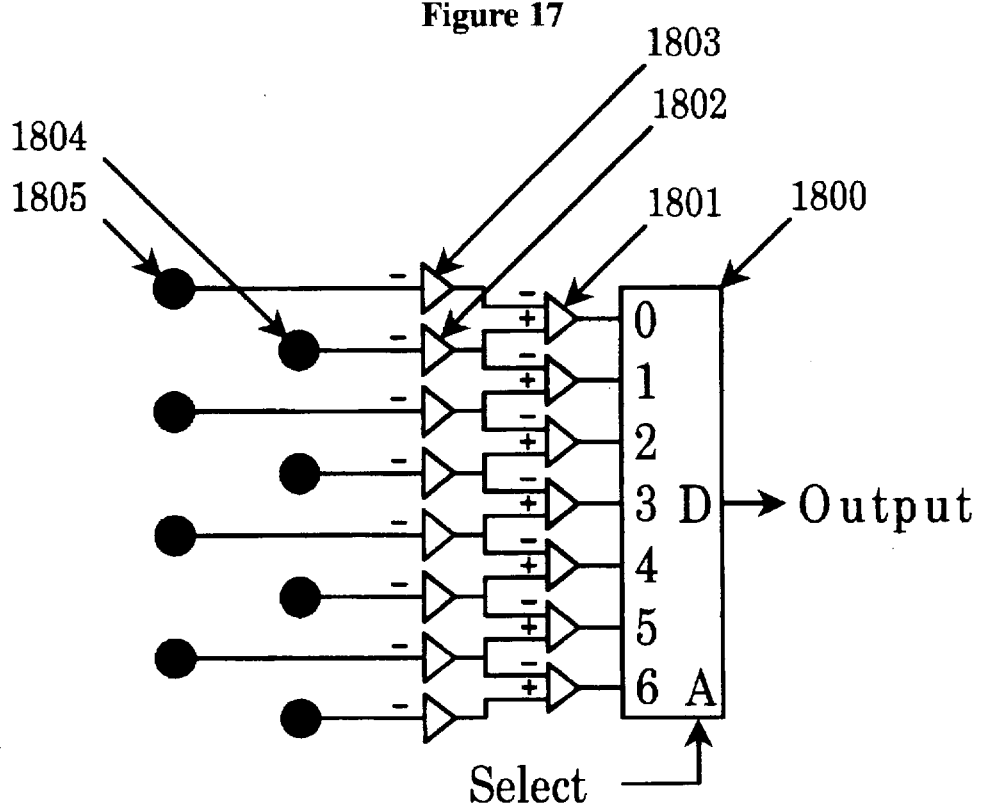

FIG. 18. Schematic of servo track detectors, amplifiers and multiplexer, according to this invention.

Figure 19:
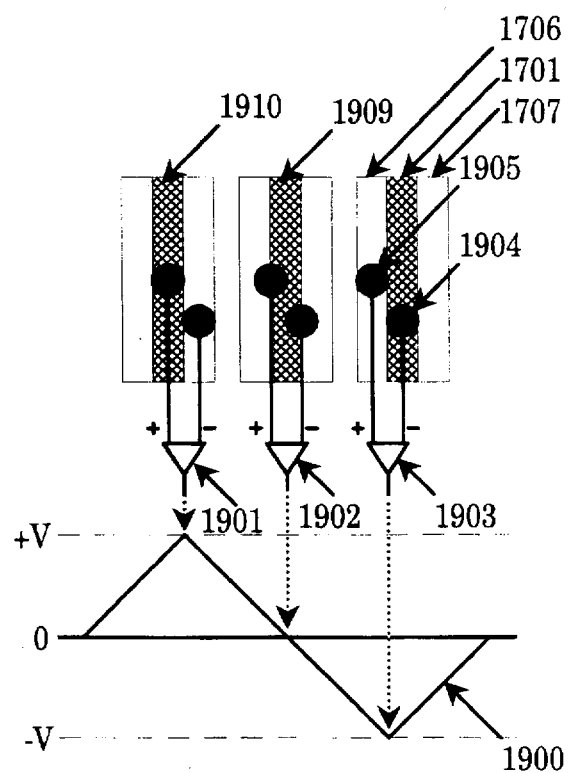

FIG. 19. Schematic of two servo track detectors and associated amplifier, and the signal created for three different positions of the servo track, according to this invention.

Figure 20:
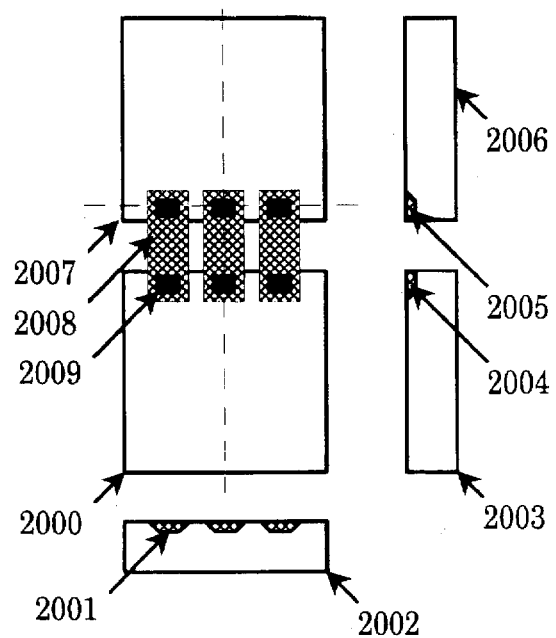

FIG. 20. Plan view and vertical and horizontal cross-sectional views of two adjacent dice in a wafer showing bonding pad pockets, according to this invention.

Figure 21:
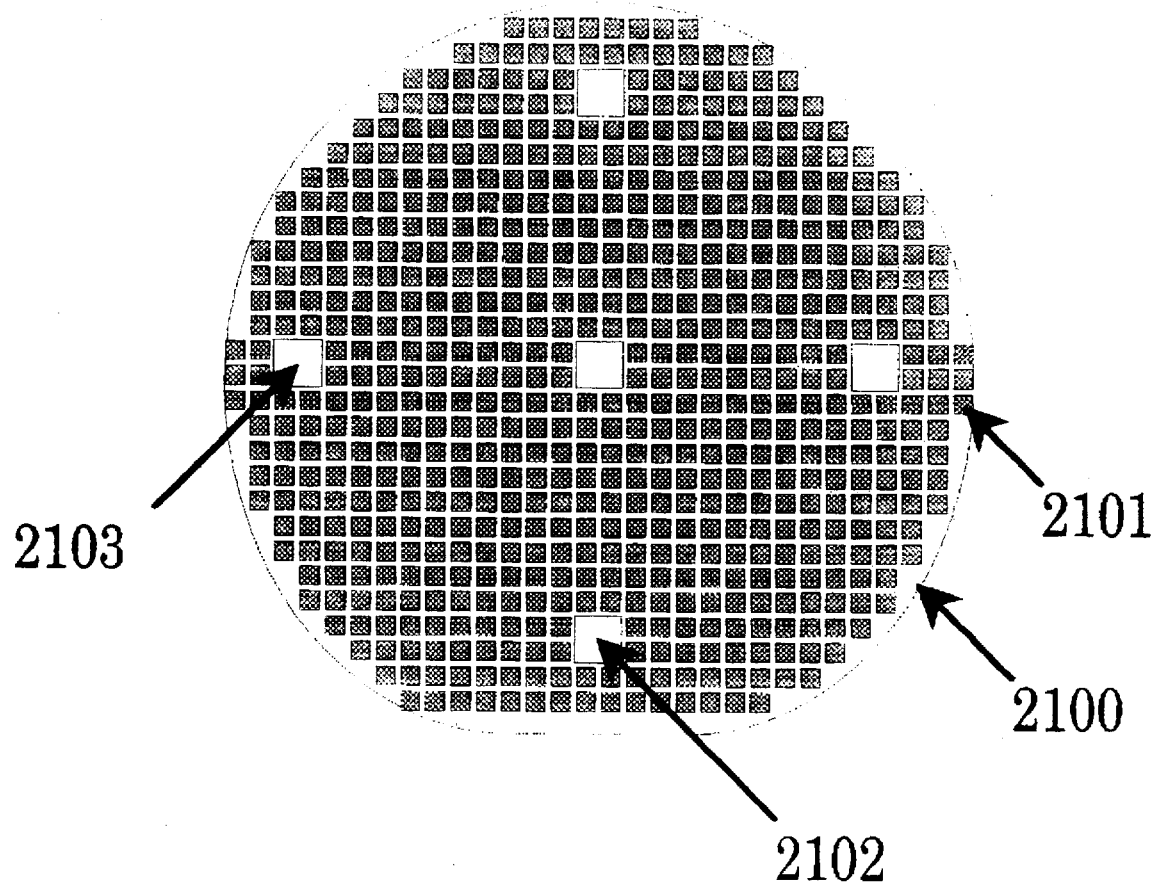

FIG. 21. Plan view of SOI wafer with clear areas revealing base wafer, according to this invention.

6. DETAILED DESCRIPTION OF THE INVENTION

The innovations described herein are all important aspects of the disk drive of this invention:

head technology media technology channel technology servo system technology

Following a review of basic electrostatics, this section describes these innovations in detail. Note that many of my techniques could be used to improve the operation of magnetic disk drives.

6.1 Review of Basic Electrostatics

To explain the operation of my new recording technology, I start with the basic physics of electrostatics. Note that I call a localized region of a dielectric material that may contain no charge (a logic 0 in my system) or a charge having a magnitude of multiple electrons (a logic 1 in my system) a charge packet.

FIG. 1 shows a prior art, 2-D cross-sectional drawing of the well-known, spherically symmetric electric field lines as 102 (solid) and equipotential lines as 101 (dotted) created by an isolated positive electric charge 100 (notice the out-going electric field lines) in free space. [Reference: *Physics, Parts I & II*, D. Haliday and R. Resnick, John Wiley & Sons, 1966, p. 726.] At a distance R from the charge, the strength of the field lines emanating from this monopole decrease only as $1/R^2$. A negative charge produces field lines going the opposite direction.

If one stores data by placing multiple such charge packets close to one another in a regular 2-D array, where some sites in the array are vacant to represent logic 0's, the many overlapping electric fields from the various charge packets make it difficult to distinguish the logic 0's from the logic 1's, even when a charge detector is brought close to each potential storage site.

FIG. 2 shows a prior art, 2-D cross-sectional drawing of the well-known electric field lines as 202 (solid) and equipotential lines as 203 (dotted) created by the combination of two equal but opposite charges. [Reference: *Physics, Parts I & II*, D. Haliday and R. Resnick, John Wiley & Sons, 1966, p. 727.] A positive charge is shown at 200 and a negative charge is shown at 201. I have drawn a dotted horizontal line 205 equidistant between the two charges to show the line of zero potential—the potential of a ground plane. The axis of symmetry is shown at 204. Notice how much more localized the electric field is than with the electric monopole in FIG. 1. This combination of equal and opposite charges creates a dipole. Its field varies as $1/R^3$, thus decreasing a factor of R faster than for a monopole.

In the instant invention, I place a grounded, thin metal film or grounded, conductive material a short distance, D, from the surface of a thin film of dielectric material. Thus the thickness of the dielectric material is also D. The presence of this nearby ground plane creates a tiny dipole, limiting the extent of the electric field of the charge packet and minimizing the interference from adjacent charge packets. The distance, D, depends upon the: (1) data storage density desired, (2) amount of localization of electric field desired, (3) distance of the detector tip from the top surface of the dielectric material, (4) depth and spatial distribution that the charge is stored in the dielectric material, and (5) type of dielectric material used.

In the instant invention, when the amount of space between the point of a field emitter tip detector and the surface of the dielectric material is of the order of one-quarter of the minimum distance between the centers of two adjacent charge packets, the distance, D, for a silicon nitride dielectric material is typically less than or equal to the minimum amount of space between the centers of two adjacent charge packets. Thus, for a negative charge packet, which contains electrons, a positive image charge appears to be present a short distance, somewhat less than D depending upon the spatial distribution of the charge in the charge packet, behind the ground plane. For example, if I desire to place charge packets on 100 nm centers, I use a thin film of silicon nitride that is 100 nm thick and a spacing of 25 nm between the point of the detector tip and the surface of the dielectric.

6.2 Basic Operation and Construction of Platters and Storage Mechanism

In my system, I store data in a coated, very smooth, rapidly rotating platter. The platter is either conductive, such as being a glassy carbon available from, by example, Kao Infosystems, or non conductive, such as crystallized glass or ceramic available from, by example, Ohara Corporation.

As shown in the cross-sectional view of FIG. 3, I coat the conductive platter 300 on both sides with a thin dielectric material 301 and 302. As shown similarly in FIG. 4, I first coat the non-conductive platter 400 on both sides with a thin conductive material 405 and 406 and then a thin dielectric material 401 and 402 on both sides. In either case, the platter is coated with a dielectric material that is capable of storing highly localized regions of electric charge as 303 and 403 for long periods of time. Silicon nitride is such a dielectric material for it has many traps that can store electrons within its bulk, rather than on its surface, for many years. Other dielectric materials such as ferroelectrics that can store charge for long periods of time in highly localized regions may be used as well.

In use, the platter is electrically grounded. As the platter spins, I create a tiny electric dipole in one tiny region of one side of the platter at a time by briefly emitting electrons from the point of a field emitter tip 304 and 404 that is a short distance from the surface of the platter. A typical distance between the exposed surface of the dielectric layer and the point of the field emitter tip is about 25 nm, which is the spacing used between the read/write head and the platter in the most advanced magnetic disk drives in 1995. If I want to increase the rate that data is written, I can have multiple spaced apart field emitter tips emitting electrons simultaneously, creating multiple charge packets.

Such a field emitter tip is one component in my read/write head, and at least one read/write head is furnished for each side of each platter in my recording system. Various methods of fabricating the field emitter tips themselves are well known, and the tip can be built from a variety of materials and have a variety of shapes.

The purposes of the field emitter tips in my application are to enable semiconductor fabrication equipment that produces a relatively large minimum feature size to be used to fabricate an electromechanical element, the field emitter tip, having a very tiny point, and to produce an element that rises above the surrounding topology of the chip it is built in. In my system, these tips are used for two functions, a write tip, or write element, is used for emitting electrons that are stored in the dielectric layer on the platter, and a read tip, or read element, is used for detecting electrons that have been stored in the dielectric layer in the platter. Typically, a write tip will have a sharper point than a read tip. I also use a third type of tip, the erase tip, which has a wedge shape rather than a conical shape, for erasing data, i.e., removing electrons, from multiple charge packets simultaneously.

FIGS. 3 and 4 show a portion of a field emitter tip 304 and 404 and a packet of charge 303 and 403 stored within the dielectric 301 and 401 on the platter 300 and 400, respectively. In these drawings, the tip may be either a read tip or a write tip. Note that the dipole field that is created during reading has its axis of symmetry at right angles to the plane of the platter, i.e., vertically in the drawing, the same as the axis of symmetry of the field emitter tip.

FIG. 5 shows a plan view of multiple possible charge packet locations as 502 to 505 in a portion 500 of one side of a platter. At this scale, the arrangement of charge packets appears to be rectangular, but it is actually slightly curved due to the storage of data on a rotating platter. Each possible charge packet is shown as $Q_{m,n}$. A charge packet will contain electrons to represent a logic "1" or be uncharged to represent a logic "0". The point 501 (shown enlarged) of the field emitter tip is shown as the black circle near $Q_{3,4}$, and its direction of travel relative to the platter is shown by the arrow. In reality, the platter moves beneath the tip. The track-to-track spacing is shown in the Figure as G, e.g., the distance between the centers of charge packets 502 and 503. The bit-to-bit spacing within a track is shown as H, i.e., the distance between the centers of charge packets 504 and 505. The length of a bit or charge packet is shown as J. The width of a bit or charge packet is shown as I. The length of a bit is more than its width because the platter is moving while the electrons are placed in the packet. Depending upon the exact emission characteristics of a field emitter tip and the circuitry that controls it, the ends of adjacent charge packets may or may not overlap slightly.

While only a single read tip or write tip is shown in FIGS. 3 to 5, multiple read and write tips may be used simultaneously in a single read/write head to increase the data rate of the system. FIG. 6 shows a plan view of possible charge packets in a portion 500 of the platter being accessed by two read or write elements 501 and 600. Due to the tiny size of the charge packets, the two tips must be spaced several charge packets away from each other.

Data can be stored in a variety of formats. Each charge packet can represent a data bit, or transitions in a series of charge packets can represent data. Various coding techniques, such as the well known run-length-limited (RLL) coding technique, can be used. The use of multiple elements accessing adjacent tracks simultaneously enables 2-D coding techniques to be used to represent data. By controlling the patterns of bits stored in the platter, 2-D coding techniques enable data to be stored more densely than 1-D coding techniques.

The circuitry that operates a write tip 700 is shown in FIG. 7. Field emitter tips have notoriously poorly controlled emission, so it is necessary to ensure that the proper amount of charge, with the proper energy, is emitted to form each charge packet. A circuit 701 is thus provided in the read/write head for each write tip to control its emission. The circuit is turned on by the Strobe signal when it is time to start writing a bit. The amount of charge emitted is specified by the IMagnitude input. For example, a charge of 1,000 electrons may be emitted. The energy of the electrons emitted is specified by the VMagnitude input, which sets the maximum voltage at the output of a current source that provides the current to the write tip 700. A feedback loop within the circuit monitors the amount of charge emitted over time to automatically shut off the flow of current at the proper time; it integrates the amount of current flowing to the write tip 700.

Data is read by sensing the current induced in a read element as the platter spins beneath the read/write head, creating an alternating current due to the movement of a charge packet beneath (or above, or whatever, depending upon the orientation of the disk drive) the read element. Thus a field emitter tip is being used in an unconventional manner, as a charge sensing element, rather than as an electron-emitting element. Because the point of a read tip is very close to the platter, and thus very close to the charge packets in it which are near the surface of the platter, the presence of the read tip, which is at virtual ground, causes an instantaneous change in the electric field distribution of the charge packets that pass beneath it. A portion of the electric field of a charge packet is briefly concentrated upon the tip rather than on the ground plane in the platter, inducing currents in the read tip and in the ground plane. Since currents are induced on changes in the charge distribution in the platter, one typically encodes the data in a run-length-limited fashion if the charge packets are placed so close together within a track that no separation between the charge packets can be detected.

Each read tip 800 is connected to its own high speed, high gain, low noise amplifier 801, as shown in FIG. 8. The current created within the read tip by its passage over a change in the distribution of charge packets is fed into the summing junction (inverting input) of an operational amplifier. The flow of current from the Output of the amplifier through the feedback resistor R 802 thus keeps the read tip at virtual ground.

FIG. 9 shows a plan view (top) and a cross-sectional view (bottom) of a portion of the read/write head chip that contains a tip 906 that may be either a read tip or a write tip. Note that the tip is formed on a pillar 904 in the silicon membrane 902 and 911 of an SOI wafer, and that the point of the tip 906 is coplanar with the tops 903 and 912 of the mechanical shields that are formed from the silicon membrane to protect it. Active circuitry 910 is formed in the base silicon wafer 900 to control the tip. Each read or write tip as 906 is connected to the active circuitry as 910 by connecting metallization 905 to the semiconductive pillar 904 containing it.

The thin insulating layer in the SOI wafer is shown as 901. The diffused portions 908 and 909 of the active circuitry 910 are formed in the base wafer 900. The highest point 907 of the topology of the active circuit 910 is lower than the top as 903 and 912 of the silicon membrane, and thus lower than the point of the read or write tip 906.

It may be advantageous to vary the shape of the point of a read tip from the shape of the point of a write tip. A very sharp point is required for a write tip to stimulate electron emission at low voltage. However, a more rounded point may be used by a read tip to direct the electric field lines toward the charge packet it is detecting.

Depending upon the data densities desired, it may be desirable to electrostatically shield each read tip to minimize the amount of electric field that it picks up from nearby charge packets, thus minimizing the amount of current induced in the read tip by nearby charge packets. The gating structure used with field emission tips in flat panel displays may be used to advantage by forming such a gating structure closely around each read tip and connecting it to ground. Alternatively, an oxide or other insulating layer may be formed on the read tip, and a thin metal film applied on top of the insulator. The metal film 1001 would be grounded or, as shown in FIG. 10, connected to another amplifier 1004 and from there to the first amplifier 1002 to form a differential sensing circuit. The metal and insulating layer may be removed from the point of the read tip by applying photoresist that is not thick enough to cover the point. The circuit is then etched briefly to expose the point of the read tip 1000. Feedback resistors 1005 and 1003 control the gain of the amplifiers 1004 and 1002.

6.3 Operation of the Erase Mechanism

Common magnetic disk drives have a read/write head with two functions, read and write. The writing of data replaces any previously stored data with new data; no explicit erase operation is required.

In my disk drive, matter, namely, electrons, rather than a magnetic field, is transferred from the read/write head to the platter to write data. These electrons must be removed to be able to reuse the storage area for new data. This removal is accomplished with an erase mechanism that is a part of my read/write head chip.

The erase mechanism uses the well-known Fowler-Nordheim tunneling. While writing data moves electrons from the read/write head to the platter, erasing data moves electrons in the opposite direction, from the platter to the read/write head.

FIG. 11 shows a plan view (top) and a cross-sectional view (bottom) of a portion of the read/write head chip that performs the erase operation. Multiple, sharp-pointed erase elements as 1101 are formed on a pillar 1100 in the silicon membrane as 902 and 1105 of an SOI wafer. The insulating layer in the SOI wafer is shown as 901. The points of the erase elements are coplanar with the top surfaces of mechanical shields as 903 and 1106 that protect it, while the active circuitry as 1104 that controls it are formed in the base silicon wafer 900. The erase elements are connected to the active circuitry by metallization 1102 that connects the active circuitry 1104 to the semiconductive pillar 1100 containing it. The coplanarity of the points of the erase elements, like the read and write elements, with the tops of the mechanical shields results from the formation of the erase elements from the same silicon membrane as the shields. The shields are simply portions of the membrane that have not been converted into field emitter tips or other microelectromechanical elements.

A close-up of the erase elements is shown in FIG. 12. The direction of travel of the platter with respect to the erase element is shown by the arrow 1203. Note that the direction of travel is at right angles to the top edge of an erase element. The arrow 1203 points in two directions because the erase mechanism can work in either direction; this is necessary so that a single design of the read/write head chip can be used on both sides of the platter, since the direction of travel reverses from one side to the other.

Unlike the read elements as 800 and write elements as 700 that are connected individually and are conical in shape so as to have a small, round point, the pillar 1100 containing the erase elements has one or more wedge-shaped regions as 1101 and 1202 that are connected together so as to erase multiple data tracks simultaneously. Using multiple, relatively large erase elements not only decreases the amount of time required to erase the data by erasing multiple data bits simultaneously, but also compensates for misalignment between the data tracks and the erase elements.

The method for erasing data from the disk drive is as follows. Data is erased as a background function for the disk drive. When the user wishes to delete a file, this fact is registered by software that controls the disk, and the area of the disk storing the file is marked for erasure. Then, when the disk is not reading or writing data, the disk performs an erase operation. Prior to beginning the erase operation, any data that is located on the disk near the data to be erased and that might be corrupted by the erase process is copied to another portion of the disk by software that controls the disk. The erase mechanism is then positioned over the data to be erased and a positive potential is applied to it. This potential draws the electrons out of the platter using Fowler-Nordheim tunneling, erasing the data. Since tunneling is a slow process, the erase mechanism is positioned over the data to be erased, and a positive potential applied to the erase mechanism, multiple times. Once the erase operation is complete, the erased section is ready for reuse by the software that controls the disk, and the software marks the area as available. A count of the number of times that the area has been erased may be kept and the area may be taken out of service when the count exceeds a value that reflects the number of times that a given area can be adequately erased.

6.4 Fabrication Method for the Read/Write Head Chip

A critical aspect of the design of the Read/Write Head Chip is the method for maintaining coplanarity within a few nanometers in a given Read/Write Head Chip of all of the:

points of the read tips points of the write tips points of the erase elements top surfaces of the mechanical shields of these elements And, to a lesser extent, it is also important to maintain the coplanarity of these aforementioned elements within a given Read/Write Head Chip with the:

top surface of the levitation pads top surface of the servo track detectors

It is important to note that this problem is complicated by the need to provide electrical isolation between these many microelectromechanical elements. In fact, I need to connect to individual field emitter tips to form the circuits I require. In contrast, the well-known technique for fabrication of field emitter tips in monocrystalline silicon wafers using silicon-axis-specific etching, such as by using potassium hydroxide (KOH), connects many emitter tips together and places a 2-D gating mechanism, a series of X- and Y- wires, on top of the wafer to be able to control the emission of small groups of the emitter tips for use in a flat panel display.

In addition, my requirement is complicated further by my need to have circuitry in the immediate vicinity of each microelectromechanical structure to be able to control its operation or to amplify the signal detected. Thus to obtain the highest data storage densities, I need to integrate full analog and digital, CMOS, BiCMOS or other circuitry within each chip containing these structures.

My method for solving this problem is as follows:

1. I use a silicon-on-insulator (SOI) wafer, not a silicon wafer. The SOI wafer is constructed from a prime, monocrystalline base wafer as 900 with typically 1-0-0 orientation that is separated from a monocrystalline silicon membrane as 902 by a thin insulator as 901, such as silicon dioxide ($SiO_2$), which is a common insulator in semiconductor manufacture. Such wafers can be bought on custom-order from, by example, AT&T Microelectronics and are commonly used to fabricate telecommunications chips. For my use in the Read/Write Head Chip, the thickness of the insulator as 901 is typically in the range of 0.25 to 0.5 um, and the thickness of the silicon membrane as 902 is typically in the range of 2.0 to 3.0 um. A standard thickness base wafer as 900 is used. These figures can be varied for other applications and are consistent with the fabrication of the SOI wafer from two silicon wafers, which are bonded together, rather than converting a single silicon wafer to an SOI wafer by bombarding it with oxygen. The base wafer is of a type suitable for building integrated circuits in it. The membrane layer is fashioned to increase its conductivity. Depending upon the needs of the lithography system used to build the chips, the base wafer may be flattened to reduce the total indicated runout (TIR) prior to its assembly with the membrane wafer.

2. The read elements, write elements, erase elements, and mechanical shields for these elements, and the levitation pads and the servo track detectors are all built in the silicon membrane as 902. The sharp-pointed, read, write and erase elements are all built using silicon-axis-specific etching. Since all of these elements are formed at the same time from the same layer of silicon, the coplanarity of their points is very well controlled, being as good as the fabrication of the SOI wafer itself. Since these are above the level of the base wafer, on relatively small islands of silicon, I say that they are formed on pillars.

3. The circuitry as 910 that controls the microelectromechanical elements is formed in the base wafer 900 after portions of the silicon membrane as 902 and insulation layer 902 have been etched away.

4. The thickness of the insulation layer and silicon membrane are chosen so that the circuitry as 910 that is built upon the base wafer does not protrude above the top of the silicon membrane as 903, and so that connections between the circuitry and the microelectromechanical elements can be made easily. Thus prior to the specification and purchase of the SOI wafers, a 3-D design of the circuit is done, taking into account the thickness of the various layers that build the active circuitry and microelectromechanical elements, rather than just considering the logical functions of the circuit, to ensure that the heights of the electrical and mechanical elements will be properly contained within the finished wafer.

As shown in FIG. 11, the points of the erase elements as 1101 are formed in the top portion of the silicon membrane. The circuitry controlling the erase elements is formed in the base wafer. The various layers of the circuitry build up, raising the top of the circuitry not only above the base wafer but also above the insulating portion of the SOI wafer and above the bottom of the silicon membrane. Being above the bottom of the silicon membrane, electrical connection to the microelectromechanical elements can be made easily, and the topology of the wafer is leveled somewhat, making it easier to perform the photolithographic operations to complete the fabrication of the chip.

FIG. 9 shows a read element or a write element that has been formed in an SOI wafer by using this method. To form these elements, the pillars as 904 upon which these elements are formed must be constructed, and then the field emitter tips as 905 must be formed on top of these pillars. A series of manufacturing steps that can be broken into two processes is required.

Starting with an SOI wafer having the specification stated above, the process for forming the pillars is the following sequence of steps, where all fabrication is performed on the side of the wafer having the silicon membrane:

1. Deposit a thin film (500 to 1,000 angstroms) of low stress, silicon nitride on the wafer for use as a hard mask.

2. Apply photoresist (resist) to the wafer. Note: if the pillars are relatively large in diameter, then a 2 um thick layer of resist can be used; this amount is thicker than used in subsequent steps since it will be used to protect the hard mask during an oxide etch step.

3. Expose and develop the resist. When exposing the resist, use a mask that defines the pillars where the raised elements (microelectromechanical elements, mechanical shields, etc.) are to be formed; a region of resist is left wherever a pillar is to be formed.

4. Transfer the pattern that is in the resist into the silicon nitride with an anisotropic, oxide-etching, reactive ion etch process, forming a hard mask. Note: the resist is left on top of the silicon nitride to protect it in a subsequent oxide etch step.

5. Use an anisotropic, silicon-etching, reactive ion etch process to produce the pillars in the silicon membrane. Note: this method of etching automatically stops when the insulating layer is reached, in which case only moderate control of the etching is required.

6. Use an oxide-etching, reactive ion etch process to etch through the insulating layer in the wafer without affecting the silicon membrane. Note: this etching automatically stops when the base silicon wafer is reached, in which case only moderate control of the etching is required.

7. Strip the resist.

Note that the silicon nitride hard mask has been left behind; it will be patterned a second time to form the emitter tips.

The process for forming the tips (read, write, and erase) on top of the pillars uses the following sequence of steps:

1. Thermally grow a 500 angstrom thick layer of oxide to protect the base wafer and the sides of the pillars.

2. Apply 1 um of resist, coating the tops of the pillars and filling the valleys between the pillars.

3. Expose and develop the resist. Note: when exposing the resist, use a mask that defines the various types of tips required and protects the base wafer and any other areas that are not to be etched.

4. Transfer the pattern that is in the resist into the silicon nitride with an anisotropic, oxide-etching, reactive ion etch process, forming a hard mask.

5. Etch the wafers in KOH to undercut the nitride masks and form the tips. Note: the thermal oxide protects the base silicon and the sides of the pillars during this step.

6. Strip the resist.

7. Use an oxide-etching, reactive ion etch process to remove the silicon nitride and oxide coating on the wafer.

8. Etch the wafer in hydrofluoric (HF) acid to clean the tips and exposed regions of the base wafer.

(Optional Step 9) If sharper tips are desired, oxidation sharpening can now be done.

(Optional Step 10) All exposed portions of the pillars may now be covered with silicon nitride to protect them from the thermal oxidation and other high temperature processing used to build the CMOS or other circuits in the base wafer. This silicon nitride can be removed after all high temperature processing is done so that connections between the pillars and circuits can be made.

6.5 Fabrication of the Housing for the Disk Drive

Housings for disk drives are typically made of cast aluminum with machined surfaces for the areas where the electromechanical parts are fastened. The housing usually has two compartments, one that is fully exposed to the user and contains the motor and bearings for the disk drive, and a printed circuit board that contains the circuitry that controls the disk drive and interfaces it to the user's computer system. A second compartment contains the platters and actuator and is fashioned to keep dirt out. This second compartment may be sealed to contain a dry gas, such as nitrogen, or, more commonly, may be vented to the atmosphere through a fine filter. The spindle of the disk drive passes between the two compartments via a ferrofluidic seal.

This seal maintains the cleanliness of the compartment containing the platters and keeps particulates from the bearing lubrication from entering this compartment.

However, assuming that the platters of my disk drive operate in a high vacuum, e.g., 10E-6 torr, this two-compartment method cannot be used. The problem is that ferrofluidic seals cannot withstand a large pressure differential across them. The typical limit is 6 psi. If one uses a series of ferrofluidic seals to minimize the pressure differential across each one, gasses slowly migrate from the high pressure side to the low pressure side as the spindle turns, which causes a vortex in the ferromagnetic fluid.

My solution is to use a three compartment system. See FIG. 13. The outer-most compartment 1312 is open to the user and contains a printed circuit board (not shown) that contains circuitry that operates the disk drive and interfaces the disk drive to the user's computer system. The inner-most compartment 1303 contains the platters as 1306 and 1308 and actuator 1313, and is capable of maintaining a high vacuum. A middle chamber 1309 contains the motor 1310 and bearings as 1311; it is also capable of maintaining a high vacuum. The spindle 1305 of the disk drive passes between the middle compartment and the inner-most compartment via an electrically conductive, ferrofluidic seal 1307. An electrically conductive seal provides a low electrical noise connection to the spindle and from there to the platters. As a result of the masking and etching of the platters, the innermost portions of both sides of a finished platter are not covered by a dielectric material and therefore are electrically connected to the spindle by a mounting nut or other fastener.

The actuator 1313 moves a series of arms as 1301 and 1302 across the surface of the platters. At the end of each arm is a read/write head chip 1600. The field emitter tips in the chip face a platter, and the backside of the read/write head chip is fastened to an arm. Wires are connected to the read/write head chip via bonding pads in pockets and pass along an arm to circuitry in the disk drive that receives the data and control signals and passes the data to and from the user.

After the disk drive is assembled, the middle and inner-most compartments are sealed in a manner capable of sustaining a high vacuum for prolonged periods of time without being pumped—the mechanical equivalent of a light bulb. These two compartments are then evacuated and outgassed independently. Finally, the evacuation ports are sealed.

Thus the middle and inner-most chambers are initially at a high vacuum, and there is virtually no pressure differential across the ferrofluidic seal. As the disk operates, minute amounts of gases and particles are given off from the bearing lubrication, slightly increasing the pressure in the middle compartment. The pressure differential across the ferrofluidic seal remains very low, maintaining the high vacuum and cleanliness in the inner-most compartment.

As is common in vacuum practice, the case is preferably made of a material such as stainless steel with a finely polished surface to provide a non-porous surface with a small micro-surface area so it can be outgassed quickly.

6.6 Basic Operation of the Radial Positioning Servo System

The radial-positioning servo system is essential to the operation of any disk drive. It positions the read/write head at the proper radius to read data that has already been recorded, or at the radius of a data track that is available for the recording of information. Using the actuator, consisting of a voice coil motor with an arm for each head, the head for the track of interest is moved to its intended approximate position, and the servo system is used to provide fine positioning. Data is then read or written when the platter is at the proper angular position beneath the single, properly positioned head. Current disk drives use servo tracks that are only read occasionally by a read/write head because the head cannot sense the servo track and perform read or write operations simultaneously. This limits the density of data storage because errors in the rotation of the disk cannot be detected. These errors are often the result of non-repetitive runout of the disk's spindle bearings and corrected, and because the radial position of the head may drift.

It is a fundamental tenet of feedback systems that the more often an error signal is available, the better job can be done to correct the error. Ideally, the error signal should be available continuously. In my disk drive, the read/write head 1600 is a parallel circuit that is able to continuously monitor one or more servo tracks 1500 while simultaneously reading and/or writing data. The resulting position-error signal is used to adjust the radial position of the read/write head via the actuator 1313.

6.7 Detailed Design of the Platters

Some patterning of the platters as 1306 is necessary in my disk drive to:

1. provide a non-stick landing zone for the head near the center of the disk
2. provide servo tracks Note, however, that no patterning is required for the areas of the disk that store data.

As shown in FIG. 14, a landing zone 1401 is provided, preferably, in the center of each platter as 1306 of my disk drive 1300 as a place to park the read/write head chip 1600 when the disk is not in use. The landing zone 1401 is just outside the area 1400 that receives the fastener that holds the platter to the spindle 1305. An area near the center of the disk is used because the smallest amount of area is wasted. The width of the landing zone is the width of the read/write head chip plus a small margin for error. Since, as is common in disk drives, the read/write head is forced against the platter by a spring in the actuator arm 1302, I must ensure that the head does not stick to the platter when it rests against it. Since the platter and portions of the read/write head chip are very flat, atomic level adhesion can develop between them.

In current disk drives; the sticking problem is called striction, which causes damage to the head and requires a large amount of torque to start the rotation of the disk from rest. Usually, there is some texturing in the landing zone area created by a fine toughening of the platter.

To avoid my read/write head from sticking to the platter, I form a series of moats and mesas in the landing zone to minimize the amount of area where direct contact is made. The majority of the area will be moats (low spots). The shape of the moats and mesas will be done so that there is no chance that a mesa will protrude into the read/write chip at the location of a fragile element such as a read or write tip. This patterning is preferably accomplished at the same time the servo tracks are made, so it does not require an extra manufacturing step. The landing zone contains servo tracks as well.

As explained in an earlier section, servo tracks are required in any disk drive so that control circuitry knows where to place data on the platter and know where to look to retrieve it. I use permanent servo tracks that are formed after the raw platters are fabricated but before they are assembled into a disk drive.

The servo tracks in my system are essentially concentric circles with mark-space patterns in them that give disk coordinates in a polar coordinate system in an encoded fashion. The encoding ensures that a 50/50 ratio of marks and spaces is used, maintaining a constant average charge density. The servo tracks are much wider and have lower data rates than the data tracks for ease of fabrication and detection, and are thus more widely spaced so that they only consume a small fraction of the disk area.

My objective is to increase the data storage density by increasing the track density significantly. Thus, it is important to provide extremely fine tracking of the data tracks. In addition, vertical runout becomes a concern since there is warpage of the platters caused by clamping them to the spindle, and this vertical runout couples into the radial runout.

As explained in a previous section, and assuming that my platters must operate in a vacuum, then I cannot use air bearings to build my disk drive. Such air bearings can have non-repetitive runout of less than 1 microinch, compared to the 10 microinches of non-repetitive runout of the best ball bearings, which can be operated in a vacuum. Unfortunately, the 10 microinch runout gives a time- and angularly-varying, radial positioning error of up to 250 nm for the platter nearest the bearings, and more for platters further away from the bearings, depending upon their distance from the bearings. The amount of runout presumably varies in a random fashion that depends upon minute imperfections in the ball bearings, the amount of slippage of the ball bearings, the way the ball bearings turn in the race, and the irrational ratio of the perimeter of a ball bearing to the perimeter of the race. Even this small amount of runout is more than the track pitch that I would like to use, so conventional servo system designs, which operate intermittently and thus cannot track instantaneous changes in position, cannot be used.

The basic problem in any servo system is, "Where do you get the error signal from?" In current disk drives, the servo tracks can only be read intermittently because the read/write head can only read or write one point at a time. Thus, there is a limit to how closely the error can be determined.

However, I have a unique read/write head chip 1600 that can perform several operations simultaneously. In particular, it can continuously read two or more servo tracks simultaneously. I thus get a continuous, very high quality error signal that allows the disk control circuitry to track, and compensate for, minute errors in the placement of a read/write head chip with respect to its side of a platter.

FIG. 15 shows an exaggerated view of the center portion of the platter. The mark-space patterns in the servo tracks as 1501 and 1502 are not shown. Multiple data tracks as 1500 are shown between each pair of servo tracks. A read/write head chip 1600 having a set of servo detectors 1610 spanning at least two adjacent servo tracks 1501 and 1502 is also shown. The landing zone is shown as 1401.

A plan view of the Read/Write Head Chip 1600 is shown in FIG. 16. The arrow 1604 shows the direction of rotation of the platter with respect to the chip. The direction of rotation can be either to the left or to the right depending upon whether the chip is mounted above or below a platter.

In the preferred embodiment, in the center of the read/write head chip 1600 is at least one set of servo track detectors 1610, at least one set of erase elements 1611, two sets of read tips 1612 and 1614 and two set of write tips 1613 and 1615. The read tips, on the outside, and write tips, on the inside, are arranged so that a read-after-write operation can be performed regardless of the direction of rotation of the platter. These many elements occupy a small portion of the chip and are shown in enlarged fashion in the lower portion of the Figure. An array of read tips and write tips is provided to provide redundancy in the event of failure of one or more tips, and to facilitate the use of multiple tips simultaneously to increase the read data rate and/or the write data rate.

The relatively large regions 1603, 1605, 1608 and 1609, shown on the left and right sides of the chip, contain levitation pads. Recessed bonding pad pockets 1601 and 1606 are shown on the top and bottom edges of the chip. The pads 1607 on the top edge, which is the edge of the chip that is closest to the center of the platters, are used to support the chip on the actuator arm, but do not carry signals. Power connections and all of the signals use the pads 1602 on the lower edge of the chip.

The principles of operation and fabrication of the servo tracks are as follows:

(Principle #1) Servo tracks are permanently formed on both sides of the platter. The servo tracks are precisely concentric with one another and nominally concentric with the center of the platter, although precise positioning with respect to the true center of the platter is not required.

The width of each servo track is large enough to make manufacturing and detection economical. The width, e.g., 1 um, is typically several times the pitch of the data tracks. A polar coordinate system is defined using a mark-space code. This code is encoded to provide error correction and detection capability to ensure accurate reception of the coordinates, and to provide a constant density of data. The data rate is much lower than found in the data tracks to further make detection relatively easy.

The servo tracks and landing zone pattern are formed in the dielectric coating on the platters using photoresist, lithography and reactive ion etching, or an embossing and etching process. The manufacturing process for pattering a platter that has already been coated with silicon nitride or other suitable dielectric material is:

1. Coat one side of the platter with photoresist.
2. Expose and develop the photoresist, using a mask that defines the servo tracks (and the moat-and-mesa pattern in the landing zone).
3. Etch the patterned side of the platter all the way through the dielectric layer, forming servo tracks on one side.
4. Coat the patterned side of the platter with photoresist to protect the servo tracks.
5. Coat the unpatterned side, the second side, of the platter with photoresist.
6. Expose and develop the photoresist on the second side of the platter, using a mask that defines the servo tracks (and the moat-and-mesa pattern in the landing zone).
7. Etch the second side of the platter all the way through the dielectric layer, forming servo tracks on the second side of the platter.
8. Strip the photoresist from both sides of the platter.

During formatting of the disk drive, the servo tracks will be charged by one or more write elements 700 in the read/write head chip. Plan and cross sectional views of a small portion of a conductive platter 1704 with data and servo tracks are shown in FIG. 17. To ensure the precise definition of the edges of the charge pattern formed by the servo tracks, voids as 1706 and 1707 are formed around the servo tracks during the patterning of the platter. The width of a void 1706 may be 1 um. So that the presence of data in the disk will have minimal impact upon levitation of the read/write head chip by the levitation pads 1616, these voids also minimize the effects of variations in curvature of the servo tracks at different radial positions of the read/write head chip on the platter.

As shown in FIG. 17, the square-hatched areas 1700, 1702 and 1705, have not been etched away and are available for storing data. The diamond-hatched areas 1701 are the portions of the servo tracks that have not been etched away (a "mark" in the mark-space pattern); these potions will be electrically charged during formatting of the disk. The area at 1703 shows the clear area resulting from the voids surrounding a servo track and a "space" in the mark-space pattern within a servo track. Thus the servo tracks essentially consist of three adjacent circles, the outer two being entirely void and the inner one bearing a mark-space pattern. Note that if a nonconductive platter with a conducting layer is used, the etching of the servo tracks must leave the conductive layer intact.

- (Principle #2) Many data tracks are placed between adjacent pairs of servo tracks; one suitable ratio of the number of data tracks to the number of servo tracks is 50:1 to minimize the amount of space lost to the servo tracks. The servo tracks are preferably placed far enough apart that their pitch is more than the total of all sources of eccentricity of any given servo track. Sources of eccentricity include, but are not limited to, any error in placement of the servo tracks on a platter, and displacement of a platter's ideal axis from the axis of rotation of the spindle it is mounted upon. For example, a servo track pitch of 25 um can be used when the total of all sources of eccentricity is 20 um, for this pitch allows the unambiguous selection of any given servo track by a simple radial-positioning mechanism that places the read/write head chip a fixed distance from the spindle, even if the radial position of the servo track is not encoded into each servo track.

- (Principle #3) The read/write chip "rides the rails"; it tracks two or more servo tracks simultaneously and sends signals to the actuator to maintain its position with respect to the selected servo tracks regardless of both repetitive and non-repetitive runout, controlling the radial position of the read/write chip over a likely range of several hundred microinches. Two servo tracks are tracked simultaneously so that minor irregularities and defects in the servo tracks can be ignored by averaging the results obtained.

- (Principle #4) Each platter is formatted in place once the entire disk drive is assembled. No servo writer is required. Formatting may be done at the factory and/or at the customer's site. Since the servo tracks, while permanently formed, cannot be read until they are charged, formatting begins in the landing zone by having the read/write chip blindly emit electrons across successive tracks in the landing zone, and detect the result, until a servo signal is detected. Then, the repetitive runout can be tracked. An "inch-worm" process is then implemented to move the read/write chip across the platter, emitting electrons only where the servo tracks are believed to be. By tracking an inner servo track while an outer servo track is charged, the radial errors, and waste of space, created by the non-repetitive runout can be minimized.

Since the data tracks are on a very fine pitch, typically much less than one micrometer to achieve very high density, it is necessary to be able to position an active read tip or write tip within a few nanometers of its ideal position with respect to a platter. The radial-positioning servo system must thus be able to detect very small errors in radial position. In addition, since the servo tracks are much further apart than the data tracks, it is necessary to be able to accurately position an active read tip or write tip on any data track between a pair of adjacent servo tracks.

FIG. 18 shows a portion of the servo track detectors and amplifiers. A servo track detector as 1804 and 1805 is a pillar whose diameter is equal to the width of a servo track. No point is formed on the pillar; the pillar has a blunt end the diameter of the pillar. Each servo detector is connected to a current amplifier as 1802 and 1803, i.e., the inverting input of an operational amplifier. Since the servo tracks are much larger than the data tracks, and the bits are physically much longer than the data bits, the data rate is relatively low so simple, low-speed amplifiers can be used.

An array of servo track detectors 1608 is used, as shown in FIG. 16. The detectors are staggered and can span three servo tracks. This enables two servo tracks to be detected at any one time.

As shown in FIG. 18, the outputs of the current amplifiers as 1802 and 1803 are fed to differential amplifiers as 1801. The outputs of the amplifiers are fed to a multiplexer 1800. Two multiplexers (not shown) are used, each connecting to the upper or lower half of the amplifiers and the one amplifier in the middle. The outputs of these multiplexers are connected to circuitry in the disk, drive that controls the actuator. This circuitry sends a Select signal to each multiplexer to select a differential amplifier.

As shown in FIG. 19, a signal 1900 is created by a differential amplifier as 1903. The sign and amplitude of the output depend upon the position of a servo track with respect to the two servo track detectors that drive the amplifier. Three different positions of the servo track are shown by the shaded band. Note that in this figure, the outputs from the amplifiers 1901 to 1903 represent the signal from a single amplifier as 1801 at three different points in time.

In one position of a servo track 1701, which is surrounded by voids 1706 and 1707, the right detector 1904 senses the servo track 1701 while the left detector 1905 does not. This creates a strong negative signal at the output of the amplifier 1903. As the servo track moves to the left with respect to the two detectors, the output increases. When the servo track 1909 is midway between the two detectors, each detector receives a comparable signal, and an output of zero results from the amplifier 1902. As the track moves further to the left, a positive output results from the amplifier 1901. When the servo track is entirely beneath the left-most detector, the most positive output results. As the track moves further to the left, the output returns to zero.

Control logic external to the read/write head chip receives the output from the multiplexer 1800 shown in FIG. 18, and provides the signals (in bit-serial fashion to save pins) that select the amplifier of interest. As a servo track moves across the array of servo detectors, one amplifier after another is chosen by the external circuitry to obtain the most sensitive indication of the position of the servo track. This provides a high quality signal to the actuator to control the radial position of the read/write head chip for the side of interest of the platter of interest. A filter is used to remove the variation in the signal caused by the information encoded in the servo tracks.

Data tracks can be placed more closely together, i.e., on a smaller pitch (center-to-center distance, measured along the disk radius), than the pitch of two adjacent servo track detectors as 1904 and 1905. This is done by having the control logic external to the read/write head chip interpolate between the minimum and maximum output values of a differential servo detector amplifier as 1903, based upon the number of data tracks desired between two adjacent servo track detectors. In the control logic, a feedback circuit controls the actuator 1313, causing it to maintain the read/write head chip at a radius that holds the output of the differential amplifier at this interpolated value.

In addition, the signal from the amplifier closest to the current servo track is selected by a multiplexer (not shown) and sent to the external circuitry for identifying the position of the head with respect to the platter. This information is useful when seeking a new data track and thus a new radial position on the platter.

6.8 Operation of the Head Levitation System

Common magnetic disk drives have a head with one or more aerodynamic surfaces. When the platter rotates, it drags air (or gas) along with it, creating a flow of air over the aerodynamic surface, creating lift, like an aircraft wing. This lift counterbalances the force of a spring presses the head against the platter. The head is lifted a distance that depends upon many factors, including the air pressure, roughness of the platter, shape of the aerodynamic surface, and the spring tension.

In my disk drive, under the assumption that the platters operate in vacuum, there is no air so aerodynamic lift cannot be used. Instead, I use electrostatic repulsion. As shown in FIG. 16, the read/write head chip 1600 contains multiple levitation zones as 1603, 1605, 1608 and 1609.

A zone is placed in each corner of the chip to uniformly lift the chip above the platter. Within each zone are curved levitation pads that are normally given a negative potential. Should it be necessary to counteract vibration of the disk drive, these pads can be given a positive potential to attract the chip to the platter.

An enlargement of a portion of one of these levitation zones is shown at 1616, although the slightly curved nature of the pads is not visible. The curvature is in the same direction as the passage of a point on a servo track over the read/write head chip (ignoring all sources of radial runout). These pads are formed from the silicon membrane as 902 on the top surface of the read/write head chip 1600 and so are very close to the platter; thus a small voltage can generate a strong electric field and a large electrostatic force. However, the pads are smooth and are shaped such that electrons are not emitted from them. The length (the horizontal dimension in the figure) of a levitation pad is chosen so that the set of active pads provides sufficient electrostatic repulsion to raise the read/write head chip the desired distance from the platter. The width (the vertical dimension in the figure) of a levitation pad is chosen to match the width of a servo track as 1701. The curvature of the levitation pads is chosen to match the average curvature of the servo tracks, since this curvature varies with the radial position of the read/write head chip. By isolating the servo tracks from data, the voids as 1706 and 1707 that are immediately adjacent to the servo tracks help compensate for the fact that the curvature of the servo pads does not match the curvature of the servo tracks for all radial positions of the read/write head chip on the platter.

Levitation pads are selected dynamically for use in repelling the read/write head chip away from the platter. Since a levitation pad can be repelled not only from a servo track but also from data stored in the platter, it is desirable to minimize the repulsive force generated by data since the data content varies dramatically depending upon whether or not data has been written into the platter. Using information from the servo detectors, a set of levitation pads is activated (given a negative potential). One or more pads in each levitation zone are activated. The activated pads are the ones most closely above the servo tracks, whose data content, and thus electrostatic charge, is known.

In summary, the platter contains servo tracks that are formed in the platter at the time of the manufacture of the platter. At the time of final assembly and test of the disk drive, the platter is formatted by applying negative charge to the servo tracks. When the levitation pads are positioned over the servo tracks, the read/write head chip is repelled away from the platter by the electrostatic force between the servo tracks and the levitation pads. This force is counterbalanced by a spring that is forcing the read/write head against the platter. An equilibrium is established that depends upon the magnitude of the potential applied to the levitation pads, the amount of overlap between the levitation pads and the servo tracks, the amount of charge in the servo tracks, and the strength of the spring. The typical spacing between the platter and the read/write head chip is very small, of the order of 25 nm.

6.9 Fabrication of Bonding Pads in Pockets

Conventional techniques for connecting wires to the read/write head chip 1600 cannot be used because the chip will be placed extremely close (typically only 25 nm away) from a spinning platter as 1306. In comparison, the typical head room required on a chip for gold-ball wire bonding is about 200 um.

My solution is to form an individual pocket for each bond pad, rather than ledges along the entire length of the chip, and to form these pockets prior to passivation and metallization for the chip. The pockets are placed along one or more edges of the chip and are deep enough that low-profile, wedge wire bonds or tape-automated bonding can be used without the lead extending above the top surface of the chip. Thus no additional processing steps are required once the pockets are formed, no additional height in the fabrication of the chip is incurred, and the photoresist does not have any additional opportunity for flowing across the wafer.

The pockets are formed by masking the wafer using a relatively thick photoresist, leaving openings where the pockets are to be formed, and isotropically etching using the well-known, silicon-lattice-axis-specific, wet etching technique. Since these pockets will be present during critical lithography steps used in the formation of the chip, care must be taken to apply the photoresist so that it does not first fill then flood out of these pockets, creating blobs or uneven thickness of photoresist in nearby areas.

The method for applying photoresist to a wafer with severe topology, such as pillars and pockets, and providing even coverage across the entire wafer, is as follows:

1. Apply the photoresist to the wafer through multiple dispensing tubes, covering the wafer, while the wafer is spinning slowly.
2. Rapidly ramp the spin speed of the wafer to 6,000 rpm.
3. Spin the water at 6,000 rpm for less than one second.
4. Immediately reduce the spin speed of the wafer to 1,200 to 1,500 rpm.
5. Spin the wafer for 30 seconds to dry the photoresist.
6. Bake the wafer on a hot plate to cure the photoresist.

This process defeats the planarizing agents that are common in photoresist, avoiding thickening of the photoresist in the low spots of the wafer. The initial, rapid spin of the wafer distributes a thin layer of photoresist across the entire wafer, allowing surface tension to produce a uniform coating, while the long, slow spin allows the photoresist to air dry without flowing back. Normally, the time that the wafer is spun rapidly would be longer, giving time for the leveling agents in the photoresist to work.

These pockets can be seen in FIG. 16 as 1601 and 1606. In addition, FIG. 20 shows a plan view, and horizontal and vertical cross-sectional views of two adjacent dice 2000 and 2007. A single pocket 2008 is made across the dicing street between the two dice. A bonding pad 2009 is formed in the bottom of a pocket. The horizontal cross sectional view 2002 shows the sloping surfaces on the left and right sides of each bonding pad pocket. The vertical cross sectional view shows the side view 2003 of die 2000, showing that the inner edge of the bonding pad pocket along the upper edge of the die is sloped. Inversely, the vertical cross-sectional view 2006 of die 2007 shows that the inner edge of the bonding pad pocket along the lower edge of the die is sloped, in the opposite direction from the one shown in die 2003.

6.10 Method for Focusing on a Wafer Containing Pillars

The fabrication method given herein for fabricating microelectromechanical elements, such as field emitter tips, on SOI wafers creates these elements on raised structures, or pillars, that rise above the surface of a base wafer. Since these pillars are formed prior to the fabrication of the analog and digital circuitry in the base wafer that controls these tips and other elements, consideration must be given to the method for fabricating this circuitry. This consideration is necessary because circuitry is normally constructed on prime, flat wafers, rather than on wafers having micromechanical structures (the pillars) on them. Such structures can be several micrometers high, more than the depth of focus of lithographic systems that are capable of defining micrometer and smaller minimum features.

My solution employs the following steps (see FIG. 21):

1. Use an ultraflat base wafer for the fabrication of the SOI wafers as 2100 that are used to build the read/write head chips. The total thickness variation of the ultraflat base wafer should be less than the depth of focus of the lithography system used to fabricate the circuitry in the wafer.

2. Areas as 2102 and 2103 without pillars or any circuitry should be distributed across the wafer. These areas reveal the base wafer; the silicon membrane and insulating layer are removed during initial processing of the wafer.

3. During fabrication of the circuitry in the base wafer, the lithography system should focus on an area without pillars, and maintain this point of focus, or an offset that depends upon the thickness of the circuitry fabricated up to that point in the fabrication process, for the exposure of the circuitry near that area, creating chips as 2101.

Although described in the context of presently preferred embodiments of this invention, it should be realized that modifications may be made to these embodiments, and that these modifications will also fall within the scope of the teaching of this invention, as set forth in the claims that follow.

What is claimed is:

1. A data storage unit, comprising:
    at least one planar substrate comprising a core that supports a layer of dielectric material;
    at least one read/write head that is coupled to an actuator for translating said at least one read/write head over said layer of dielectric material, said at least one read/write head comprising at least one read electrode structure coupled to a read receiver circuit on said read/write head and at least one write electrode structure coupled to a write control circuit on said read/write head, said write electrode structure being responsive to said write control circuit for emitting charge carriers towards said layer of dielectric material for storage in said layer of dielectric material as a charge packet, said read electrode structure being responsive to an electric field of a charge packet stored in said layer of dielectric material for outputting a signal to said read receiver circuit; and
    means for levitating said read/write head over said layer of dielectric material during a rotation of said planar substrate.

2. A data storage unit as set forth in claim 1, wherein said core is electrically conductive and is grounded at least during a rotation of said planar substrate.

3. A data storage unit as set forth in claim 1, wherein said at least one read/write head further comprises at least one erase electrode structure coupled to an erase control circuit on said read/write head, said erase electrode structure being responsive to said erase control circuit for applying an electrical potential to said layer of dielectric material for extracting charge packets therefrom.

4. A data storage unit as set forth in claim 1, wherein said layer of dielectric material is circular in shape and comprises a plurality of concentric servo tracks each storing information for controlling a positioning of said read/write head relative to said layer of dielectric material, each servo track comprising a plurality of discrete regions of said dielectric material that store charge carriers.

5. A data storage unit as set forth in claim 4 wherein said regions are disposed for encoding information expressive of a substrate-referenced polar coordinate system.

6. A data storage unit as set forth in claim 4, wherein said levitating means comprises a plurality of planar electrodes disposed on said at least one read/write head, said plurality of planar electrodes being spaced apart on said read/write head for overlying at least two of said plurality of concentric servo tracks and being energized during a rotation of said substrate with a voltage potential for generating an electrostatic repulsive force between said read/write head and said charge carriers stored within said regions.

7. A data storage unit as set forth in claim 1, wherein said at least one substrate is disposed within a first evacuated chamber.

8. A data storage unit a set forth in claim 7 and further comprising a motor means coupled to said substrate for rotating said substrate about an axis of rotation, wherein said motor means is disposed within a second evacuated chamber.

9. A data storage unit as set forth in claim 1, wherein said at least one read/write head is comprised of a potion of a semiconductor wafer, and wherein said at least one read electrode structure, said read receiver circuit, said at least one write electrode structure, and said write control circuit are all fabricated within and upon said potion of said semiconductor wafer using photolithographic processing techniques.

10. A data storage unit as set forth in claim 9, wherein said semiconductor wafer is a semiconductor-on-insulator wafer comprised of a base semiconductor substrate, a layer of dielectric material overlying said base semiconductor substrate, and a semiconductor layer overlying said dielectric layer, wherein said read electrode structure is disposed atop a first pedestal formed from said semiconductor layer, wherein said write electrode structure is disposed atop a second pedestal formed from said semiconductor layer, and wherein said read receiver circuit and said write control circuit are fabricated within said base semiconductor substrate.

11. A data storage unit as set forth in claim 1, wherein said layer of dielectric material is circular in shape and comprises a plurality of concentric data tracks each capable of storing a plurality of charge packets, and wherein said at least one read/write head is comprised of a plurality of said read electrode structures each coupled to one of said read receiver circuits and a plurality of said write electrodes structures each coupled to one of said write control circuits, wherein said plurality of read electrode structures are disposed for simultaneously sensing a presence of charge packets from a plurality of said data tracks, and wherein said plurality of write electrode structures are disposed for simultaneously emitting charge carriers towards a plurality of said data tracks.

12. A data storage unit as set forth in claim 1, wherein said at least one read/write head further comprises a plurality of erase electrode structures coupled to an erase control circuit on said read/write head, said erase electrode structures being responsive to said erase control circuit for applying an electrical potential to said layer of dielectric material for extracting charge packets therefrom, wherein said at least one read/write head is comprised of a portion of a semiconductor on insulator wafer comprised of a base semiconductor substrate, a layer of dielectric material overlying said base semiconductor substrate, and a semiconductor layer overlying said dielectric layer, wherein said erase electrode structures are disposed atop pedestals formed from said semiconductor layer, and wherein said erase control circuit is fabricated within said base semiconductor substrate.

13. A data storage unit as set forth in claim 1 wherein said read receiver circuit is comprised of an amplifier means having an input node, an output node, and a feedback component coupled between said input node and said output node for maintaining said input node at a virtual ground potential, and wherein said at least one read electrode structure is electrically coupled to said virtual ground potential of said input node.

14. A data storage unit as set forth in claim 1, wherein said layer of dielectric material is circular in shape and comprises a landing zone region for said at least one read/write head, and wherein said layer of dielectric material within said landing zone region is photolithographically processed for fabricating a plurality of three-dimensional structures in said landing zone region for reducing an adhesive force between said landing zone region and said at least one read/write head.

15. A data storage unit as set forth in claim 4, wherein said levitating means comprises a plurality of planar electrodes disposed on said at least one read/write head, said plurality of planar electrodes being spaced apart on said read/write head for overlying at least two of said plurality of concentric servo tracks and being controllably energized during a rotation of said substrate with a variable voltage potential for generating a variable magnitude electrostatic repulsive force between said read/write head and said charge carriers stored within said regions.

16. A data storage unit as set forth in claim 1 wherein said layer of dielectric material is comprised of silicon nitride, and wherein charge packets are stored within a thickness of said layer of silicon nitride.

17. A data storage unit as set forth in claim 1, wherein said at least one read/write head is fabricated from a semiconductor-on-insulator wafer comprised of a base semiconductor substrate, a layer of dielectric material overlying said base semiconductor substrate, and a semiconductor layer overlying said dielectric layer, said semiconductor layer having a top surface that is disposed in a spaced apart manner from said layer of dielectric material during a rotation of said substrate, wherein said read electrode structure is comprised of a first upstanding structure disposed atop a first pedestal formed from said semiconductor layer, wherein said write electrode structure is comprised of a second upstanding structure disposed atop a second pedestal formed from said semiconductor layer, and wherein said first and second upstanding structures do not extend beyond said top surface.

18. A data storage unit as set forth in claim 17, wherein said at least one read/write head is further comprised of a plurality of recessed interconnection terminals that do not extend beyond said top surface.

19. A data storage unit, comprising:

at least one substrate layer that supports a layer of dielectric material;

at least one read/write head that is coupled to an actuator for translating said at least one read/write head relative to a surface of said layer of dielectric material, said at least one read/write head comprising a portion of a semiconductor wafer that is photolithographically processed so as to form at least one read field emitter tip that is coupled to a read receiver circuit that is fabricated in said portion of said semiconductor wafer, said portion of said semiconductor wafer also being photolithographically processed so as to form at least one write field emitter tip coupled to a write control circuit that is fabricated in said portion of said semiconductor wafer, said write field emitter tip being responsive to said write control circuit for emitting electrons from said write field emitter tip into said layer of dielectric material for storage in said layer of dielectric material as a localized region of stored charge, said read field emitter tip being responsive to a presence of an electric field resulting from a localized region of stored charge for outputting a signal to said read receiver circuit; and means for maintaining said read/write head in a spaced-apart relationship to said surface of said layer of dielectric material during relative movement between said read/write head and said substrate.

* * * * *